United States Patent
Iimura et al.

(10) Patent No.: US 7,795,194 B2
(45) Date of Patent: Sep. 14, 2010

(54) SYNTHETIC LUBRICATING OIL AND LUBRICATING OIL COMPOSITION

(75) Inventors: Yuriko Iimura, Sodegaura (JP); Hideki Hirano, Sodegaura (JP); Yasushi Tohi, Sodegaura (JP); Naomi Urakawa, Sodegaura (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 1254 days.

(21) Appl. No.: 11/286,412

(22) Filed: Nov. 25, 2005

(65) Prior Publication Data

US 2006/0116303 A1    Jun. 1, 2006

(30) Foreign Application Priority Data

Nov. 26, 2004    (JP) .............................. 2004-341840

(51) Int. Cl.
*C10M 107/02*    (2006.01)
*C10L 1/192*    (2006.01)

(52) U.S. Cl. ........................... 508/591; 585/326; 585/12

(58) Field of Classification Search ................. 508/591; 585/12, 326
See application file for complete search history.

(56) References Cited

U.S. PATENT DOCUMENTS

| | | | |
|---|---|---|---|
| 3,780,128 A | 12/1973 | Shubkin | |
| 4,032,591 A | 6/1977 | Cupples et al. | |
| 4,956,122 A | 9/1990 | Watts et al. | |
| 5,017,279 A | 5/1991 | Oswald et al. | |
| 5,105,038 A * | 4/1992 | Chen et al. | ..................... 585/10 |
| 5,858,935 A * | 1/1999 | Watts et al. | .................. 508/491 |
| 6,583,239 B2 * | 6/2003 | Minami et al. | .............. 526/127 |
| 6,713,439 B2 | 3/2004 | Watts | |
| 2002/0143113 A1 | 10/2002 | Minami et al. | |
| 2004/0147693 A1 | 7/2004 | DiMaio | |

FOREIGN PATENT DOCUMENTS

| | | |
|---|---|---|
| JP | 57-117595 A | 7/1982 |
| JP | S59-89397 A | 5/1984 |
| JP | 61-221207 A | 10/1986 |
| JP | 1-163136 A | 6/1989 |
| JP | 2-1163 B2 | 1/1990 |
| JP | 2-7998 B2 | 2/1990 |
| JP | H02-097594 A | 4/1990 |
| JP | H02-283794 A | 11/1990 |
| JP | H03-505343 A | 11/1991 |
| JP | 7-121969 B2 | 12/1995 |
| JP | 2796376 B2 | 6/1998 |
| JP | 2000-501126 A | 2/2000 |
| JP | 2001-335607 A | 12/2001 |
| JP | 2002-518582 A | 6/2002 |
| JP | 2004-10894 A | 1/2004 |
| WO | WO 99/67347 A2 | 12/1999 |

* cited by examiner

*Primary Examiner*—Glenn Caldarola
*Assistant Examiner*—Jim Goloboy
(74) *Attorney, Agent, or Firm*—Buchanan Ingersoll & Rooney PC

(57) ABSTRACT

A synthetic lubricating oil comprising an α-olefin (co)polymer defined by the features (i) to (v).

Also, a lubricating oil composition including the above-mentioned synthetic lubricating oil and a low-viscosity base oil. The synthetic lubricating oil and the lubricating oil composition have high thermal oxidation stability and are excellent in viscosity index, low-temperature viscosity properties and shear stability.

3 Claims, No Drawings

SYNTHETIC LUBRICATING OIL AND LUBRICATING OIL COMPOSITION

FIELD OF THE INVENTION

The present invention relates to a synthetic lubricating oil and a lubricating oil composition each of which has high thermal oxidation stability and is excellent in viscosity index, low-temperature viscosity properties and shear stability.

BACKGROUND OF THE INVENTION

For grease lubricating oils, engine oils, gear oils, hydraulic oils, etc., various properties are required, and in recent years, as the internal combustion engines are made to have higher performance and higher output power or as the operation conditions become severer, higher properties of internal combustion engine parts, such as higher abrasion resistance, heat resistance, sludge resistance, lubricating oil consumption properties and fuel saving, have been required. In particular, long drain interval (lengthening of life) has been required, and for the requirement, evaporation loss of the lubricating oils and lowering of viscosity attributable to shearing need to be further reduced. On the other hand, in order to ensure fuel saving, wide ranging has been promoted, and excellent low-temperature viscosity properties of the lubricating oils have become necessary. Accordingly, as the grease lubricating oils, engine oils, gear oils, hydraulic oils, etc., those having long life, namely, those having low-evaporation properties and favorable temperature-viscosity properties, have been desired.

As synthetic lubricating oils for use as lubricating base oils of automotive gear oils, engine oils, industrial lubricating oils and hydraulic oils, poly-α-olefins (PAO) have been largely used industrially. Such PAO can be obtained by oligomerization of higher α-olefins using acid catalysts, as described in U.S. Pat. No. 3,780,128, U.S. Pat. No. 4,032,591 and Japanese Patent Laid-Open Publication No. 163136/1989.

On the other hand, it is known that ethylene/α-olefin copolymers are also employable as synthetic lubricating oils having excellent viscosity index, oxidation stability, shear stability and heat resistance, as described in Japanese Patent Laid-Open Publication No. 117595/1982.

For preparing the ethylene/α-olefin copolymers used as the synthetic lubricating oils, such a process using a vanadium catalyst comprising a vanadium compound and an organoaluminum compound as described in Japanese Patent Publication No. 1163/1990 and Japanese Patent Publication No. 7998/1990 has been heretofore employed. Of the ethylene/α-olefin copolymers, an ethylene/propylene copolymer is mainly employed.

As a process for preparing copolymers with high polymerization activity, such a process using a catalyst system comprising a metallocene compound such as zirconocene and an organoaluminum oxy-compound (aluminoxane) as described in Japanese Patent Laid-Open Publication No. 221207/1986 and Japanese Patent Publication No. 121969/1995 is known, and in Japanese Patent No. 2796376, a process for preparing a synthetic lubricating oil comprising an ethylene/α-olefin copolymer that is obtained by the use of a catalyst system comprising a combination of a specific metallocene catalyst and aluminoxane is disclosed.

In recent years, the environment where the lubricating oils are used is becoming severer, while life lengthening of lubricating oils tends to be desired in consideration of environmental problems, and the demand for the synthetic lubricating oils such as PAO and an ethylene/propylene copolymer having excellent low-temperature viscosity properties and thermal oxidation stability tends to be increased. From the viewpoints of reduction of fuel consumption and saving of energy, further improvements in viscosity index and low-temperature viscosity properties have been desired.

Patent document 1: U.S. Pat. No. 3,780,128
Patent document 2: U.S. Pat. No. 4,032,591
Patent document 3: Japanese Patent Laid-Open Publication No. 163136/1989
Patent document 4: Japanese Patent Laid-Open Publication No. 117595/1982
Patent document 5: Japanese Patent Publication No. 1163/1990
Patent document 6: Japanese Patent Publication No. 7998/1990
Patent document 7: Japanese Patent Laid-Open Publication No. 221207/1986
Patent document 8: Japanese Patent Publication No. 121969/1995
Patent document 9: Japanese Patent No. 2796376

OBJECT OF THE INVENTION

It is an object of the present invention to provide a synthetic lubricating oil and a lubricating oil composition each of which has high thermal oxidation stability and is excellent in viscosity index, low-temperature viscosity properties and shear stability.

SUMMARY OF THE INVENTION

As a result of earnest studies to solve the above problems, it has been found that a low-molecular weight polymer obtained by homopolymerizing an α-olefin having a specific number of carbon atoms or copolymerizing the α-olefin and ethylene and having a specific molecular weight distribution exhibits excellent thermal oxidation stability, viscosity index and low-temperature viscosity properties as a synthetic lubricating oil. Based on the finding, the present invention has been accomplished.

That is to say, the present invention is, in one aspect, a synthetic lubricating oil comprising an α-olefin (co)polymer defined by the following features (i) to (v):

(i) said (co)polymer contains constituent units derived from (a) at least one monomer selected from α-olefins of 8 to 20 carbon atoms in amounts of 90 to 100% by mol and contains constituent units derived from (b) ethylene in amounts of 0 to 10% by mol, (ii) the kinematic viscosity at 100° C. is in the range of 8 to 500 mm²/s, (iii) the number-average molecular weight (Mn), as measured by gel permeation chromatography, is in the range of 500 to 15,000, (iv) said (co)polymer satisfies the following formulas (I) and (II):

$$A \leq 24.0 \times \mathrm{Exp}(-0.0239 \times K) \quad \text{(I)}$$

$$B \leq 0.0775 \times K \quad \text{(II)}$$

wherein A is a content (%) of a (co)polymer having a molecular weight, as measured by gel permeation chromatography, of not more than 1,000, B is a content (%) of a (co)polymer having a molecular weight of not less than 20,000, and K is a kinematic viscosity (mm²/s) at 100° C., and (v) the molecular weight distribution (Mw/Mn) is in the range of 1.1 to 1.8.

The present invention is, in another aspect, a lubricating oil composition comprising the above-mentioned synthetic lubricating oil and a low-viscosity base oil.

DETAILED DESCRIPTION OF THE INVENTION

The synthetic lubricating oil of the invention comprises the following α-olefin (co)polymer. Examples of (a) the monomers of 8 to 20 carbon atoms constituting the α-olefin (co)polymer include straight-chain α-olefins, such as 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene and 1-eicosene; and branched α-olefins, such as 8-methyl-1-nonene, 7-methyl-1-decene, 6-methyl-1-undecene and 6,8-dimethyl-1-decene. Of these, preferable are straight-chain α-olefins of 8 to 12 carbon atoms, and particularly preferable is 1-decene.

The content of constituent units derived from (a) the monomer comprising the α-olefin of 8 to 20 carbon atoms and constituting the α-olefin (co)polymer is in the range of 90 to 100% by mol, preferably 95 to 100% by mol.

The content of constituent units derived from (b) ethylene and constituting the α-olefin (co)polymer is in the range of 0 to 10% by mol, preferably 0 to 5% by mol. The content of constituent units derived from an α-olefin of 3 to 6 carbon atoms, which is added when needed, is preferably in the range of 0 to 30% by mol.

The α-olefin (co)polymer is a polymer of (a) at least one monomer comprising the α-olefin of 8 to 20 carbon atoms α-olefin content: 100% by mol) or a copolymer of the monomer and (b) ethylene. Further, (c) an α-olefin of 3 to 6 carbon atoms can be contained as a copolymer component, when needed. Examples of the α-olefins of 3 to 6 carbon atoms include straight-chain α-olefins, such as propylene, 1-butene, 1-pentene and 1-hexene; and branched α-olefins, such as 4-methyl-1-pentene. These α-olefins can be used singly or in combination of two or more kinds.

In the present invention, the kinematic viscosity of the α-olefin (co)polymer at 100° C. is in the range of 8 to 500 mm²/s, preferably 20 to 150 mm²/s.

The number-average molecular weight (Mn) of the α-olefin (co)polymer in the present invention is in the range of 500 to 15,000, preferably 1,500 to 4,300.

The number-average molecular weight can be measured by gel permeation chromatography (GPC) calibrated using a standard substance (monodisperse polystyrene (PSt)) having a known molecular weight.

In the α-olefin (co)polymer in the present invention, the content of a (co)polymer having a molecular weight, as measured by gel permeation chromatography, of not more than 1,000 is in the range defined by the formula (I), and the content of a (co)polymer having a molecular weight of not less than 20,000 is in the range defined by the formula (II).

$$A \leq 24.0 \times \mathrm{Exp}(-0.0239 \times K) \quad (\mathrm{I})$$

$$B \leq 0.0775 \times K \quad (\mathrm{II})$$

In the above formulas, A is a content (%) of a (co)polymer having a molecular weight, as measured by gel permeation chromatography, of not more than 1,000, B is a content (%) of a (co)polymer having a molecular weight of not less than 20,000, and K is a kinematic viscosity (mm²/s) at 100° C.

The molecular weight distribution (Mw/Mn) of the α-olefin (co)polymer in the present invention is in the range of 1.1 to 1.8, preferably 1.2 to 1.7.

The content of unsaturated groups at the molecular one ends can be determined in the following manner. From a ratio of peak areas of protons in the unsaturated group portions to peak areas of all protons obtained by $^1$H-NMR, the number N of unsaturated groups based on the number of all protons can be determined, and using an absolute molecular weight M, the content of the unsaturated groups at the molecular one ends can be calculated from the formula N×M×2/14. In the present invention, the content of the unsaturated groups at the molecular one ends is in the range of 0.001 to 10%, preferably 0.05 to 8%.

Preparation of α-olefin (co)polymer

The α-olefin (co)polymer can be prepared referring to such catalysts used in the preparation of α-olefin (co)polymers as described in Japanese Patent Laid-Open Publication No. 41303/1990, Japanese Patent Laid-Open Publication No. 41305/1990, Japanese Patent Laid-Open Publication No. 274703/1990, Japanese Patent Laid-Open Publication No. 274704/1990, Japanese Patent Laid-Open Publication No. 179005/1991, Japanese Patent Laid-Open Publication No. 179006/1991, Japanese Patent Laid-Open Publication No. 193796/1991, Japanese Patent Laid-Open Publication No. 69394/1992, Japanese Patent Laid-Open Publication No. 17589/1993, Japanese Patent Laid-Open Publication No. 122718/1994, Japanese Patent Laid-Open Publication No. 120127/1996, Japanese Patent Laid-Open Publication No. 239414/1996, Japanese Patent Laid-Open Publication No. 087716/1998, Japanese Patent Laid-Open Publication No. 212194/2000, WO 01/27124, WO 02/074855, WO 04/029062, EP 0881236 and EP 1416000.

More specifically, in the preparation of the α-olefin (co)polymer, a homopolymer or a copolymer can be obtained by homopolymerizing an α-olefin of 8 to 20 carbon atoms or copolymerizing an α-olefin of 8 to 20 carbon atoms, ethylene and if necessary an α-olefin of 3 to 6 carbon atoms, in the presence of, for example, an olefin polymerization catalyst comprising:

(A) a transition metal compound of a Group 4 transition metal of the periodic table, and (B) at least one compound selected from:

(B-1) an organometallic compound, (B-2) an organoaluminum compound, (B-3) an organoaluminum oxy-compound, and (B-4) a compound which reacts with the Group 4 transition metal compound (A) to form an ion pair.

The compounds (A) and (B) used herein are described below in more detail.

(A) Transition Metal Compound

As the transition metal compound (A) for use in the present invention, known Group 4 to Group 6 transition metal compounds having olefin polymerizability are employable without any restriction. For example, halogenation products of transition metals of Group 4 to Group 6 of the periodic table, alkylation products thereof, alkoxylation products thereof, and non-bridged or bridged metallocene compounds are employable. Of these, preferable are halogenation products of periodic table Group 4 transition metals, alkylation products thereof, alkoxylation products thereof, and non-bridged or bridged metallocene compounds. Preferred embodiments of the transition metal compound (A) are described below.

Examples of the transition metal halogenation products, the transition metal alkylation products and the transition metal alkoxylation products include titanium tetrachloride, dimethyltitanium dichloride, tetrabenzyltitanium, tetrabenzylzirconium and tetrabutoxytitanium.

The non-bridged or bridged metallocene compound is, for example, a compound represented by the following formula (1) which is a periodic table Group 4 transition metal compound having cyclopentadienyl skeleton.

$$ML_x \quad [1]$$

In the above formula, M is a transition metal atom selected from Group 4 of the periodic table, preferably zirconium, titanium or hafnium. x is a valence of the transition metal and is a number of L. L is a ligand or a group coordinated to the transition metal; at least one L is a ligand having cyclopentadienyl skeleton; and L other than the ligand having cyclopentadienyl skeleton is a group or an atom selected from a halogen, a hydrogen atom, a hydrocarbon group of 1 to 10 carbon atoms, a neutral, conjugated or non-conjugated diene of 10 or less carbon atoms, an anionic ligand and a neutral ligand capable of coordination with a lone pair, two or more of said L being the same or different.

Examples of the ligands having cyclopentadienyl skeleton include a cyclopentadienyl group, an alkyl substituted cyclopentadienyl group, an indenyl group, an alkyl substituted indenyl group, a 4,5,6,7-tetrahydroindenyl group, a fluorenyl group and an alkyl substituted fluorenyl group. These groups may be substituted with halogen atoms, trialkylsilyl groups or the like.

When the compound represented by the formula [1] contains two or more ligands having cyclopentadienyl skeleton, two ligands having cyclopentadienyl skeleton among them may be bonded to each other through an alkylene group, a substituted alkylene group, a silylene group, a substituted silylene group or the like. Such a compound is sometimes referred to as a "bridged metallocene compound" hereinafter, and a compound other than such a compound is sometimes referred to as a "non-bridged metallocene compound" hereinafter.

Of the above compounds, preferable is, for example, a compound represented by the following formula [2].

$$ML_a X_b \quad [2]$$

In the above formula, M is a transition metal of Group 4 of the periodic table, specifically zirconium, titanium or hafnium, L is a ligand coordinated to the transition metal, a is an integer of 1 or greater and is a number of L, X is a group or an atom bonded to the transition metal and selected from a halogen, a hydrogen atom, a hydrocarbon group of 1 to 10 carbon atoms, a neutral, conjugated or non-conjugated diene of 10 or less carbon atoms, an anionic ligand and a neutral ligand capable of coordination with a lone pair, each X being the same or different, and b is an integer of 1 or greater and is a number of X.

In the formula (2), L is a ligand coordinated to the transition metal, and at least one L is a ligand having cyclopentadienyl skeleton. Examples of the ligands having cyclopentadienyl skeleton include a cyclopentadienyl group; alkyl substituted cyclopentadienyl groups, such as methylcyclopentadienyl, dimethylcyclopentadienyl, trimethylcyclopentadienyl tetramethylcyclopentadienyl, pentamethylcyclopentadienyl, ethylcyclopentadienyl, methylethylcyclopentadienyl, propylcyclopentadienyl, methylpropylcyclopentadienyl, butylcyclopentadienyl, methylbutylcyclopentadienyl and hexylcyclopentadienyl; an indenyl group; a 4,5,6,7-tetrahydroindenyl group; and a fluorenyl group. These groups may be substituted with halogen atoms, trialkylsilyl groups or the like.

In the formula [2], a is an integer of 1 or greater and is a number of L. In the formula [2], M is zirconium, titanium or hafnium. X is a group or an atom bonded to the transition metal and selected from a halogen, a hydrogen atom, a hydrocarbon group of 1 to 10 carbon atoms, a neutral, conjugated or non-conjugated diene of 10 or less carbon atoms, an anionic ligand and a neutral ligand capable of coordination with a lone pair, and each X is the same or different. Examples of the halogens are fluorine, chlorine, bromine and iodine. Examples of the hydrocarbon groups include methyl, ethyl, n-propyl, isopropyl, 2-methylpropyl, 1,1-dimethylpropyl, 2,2-dimethylpropyl, 1,1-diethylpropyl, 1-ethyl-1-methylpropyl, 1,1,2,2-tetramethylpropyl, sec-butyl, tert-butyl, 1,1-dimethylbutyl, 1,1,3-trimethylbutyl, neopentyl, cyclohexylmethyl, cyclohexyl and 1-methyl-1-cyclohexyl. Examples of the neutral, conjugated or non-conjugated dienes of 10 or less carbon atoms include s-cis- or s-trans-$\eta^4$-1,3-butadiene, s-cis- or s-trans-$\eta^4$-1,4-diphenyl-1,3-butadiene, s-cis- or s-trans-$\eta^4$-3-methyl-1,3-pentadiene, s-cis- or s-trans-$\eta^4$-1,4-dibenzyl-1,3-butadiene, s-cis- or s-trans-$\eta^4$-2,4-hexadiene, s-cis- or s-trans-$\eta^4$-1,3-pentadiene, s-cis- or s-trans-$\eta^4$-1,4-ditolyl-1,3-butadiene, and s-cis- or s-trans-$\eta^4$-1,4-bis(trimethylsilyl)-1,3-butadiene. Examples of the anionic ligands include alkoxy groups, such as methoxy, tert-butoxy and phenoxy; carboxylate groups, such as acetate and benzoate; and sulfonate groups, such as mesylate and tosylate. Examples of the neutral ligands capable of coordination with a lone pair include organic phosphorus compounds, such as trimethylphosphine, triethylphosphine, triphenylphosphine and diphenylmethylphsophine; and ethers, such as tetrahydrofuran, diethyl ether, dioxane and 1,2-dimethoxyethane. Each X may be the same or different. In the formula [2], b is an integer of 1 or greater and is a number of X.

When the compound represented by the formula [2] contains two or more ligands having cyclopentadienyl skeleton, two ligands having cyclopentadienyl skeleton among them may be bonded to each other through an alkylene group, such as ethylene or propylene; a substituted alkylene group, such as diphenylmethylene; an alkylidene group, such as isopropylidene; a silylene group; or a substituted silylene group, such as dimethylsilylene, diphenylsilylene or methylphenylsilylene. Two or more ligands having cyclopentadienyl skeleton may be the same or different.

When the compound represented by the formula [2] contains two ligands having cyclopentadienyl group, this compound is more specifically represented by the following formula [3] or [4].

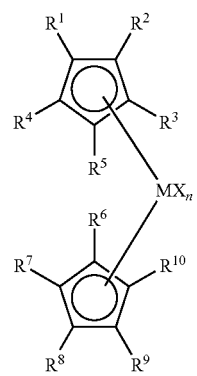

[3]

In the above formula, M is zirconium, titanium or hafnium, $R^1$, $R^2$, $R^3$, $R^4$, $R^5$, $R^6$, $R^7$, $R^8$, $R^9$ and $R^{10}$ are each selected from hydrogen, a hydrocarbon group and a silicon-containing hydrocarbon group and may be the same or different, neighboring substituents among $R^1$ to $R^{10}$ may be bonded to each other to form a ring, X is a group or an atom selected from a halogen, a hydrogen atom, a hydrocarbon group of 1 to 10 carbon atoms, a neutral, conjugated or non-conjugated diene of 10 or less carbon atoms, an anionic ligand and a neutral ligand capable of coordination with a lone pair, each X being the same or different, and n is 1 or 2 and is a number of X.

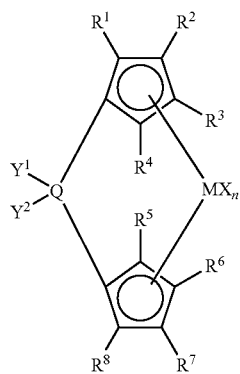

[4]

In the above formula, M is zirconium, titanium or hafnium, $R^1$, $R^2$, $R^3$, $R^4$, $R^5$, $R^6$, $R^7$ and $R^8$ are each selected from hydrogen, a hydrocarbon group and a silicon-containing hydrocarbon group and may be the same or different, neighboring substituents among $R^1$ to $R^8$ may be bonded to each other to form a ring, X is a group or an atom selected from a halogen, a hydrogen atom, a hydrocarbon group of 1 to 10 carbon atoms, a neutral, conjugated or non-conjugated diene of 10 or less carbon atoms, an anionic ligand and a neutral ligand capable of coordination with a lone pair, each X being the same or different, n is 1 or 2 and is a number of X, Q is selected from carbon, silicon and germanium, and $Y^1$ and $Y^2$ are each selected from hydrogen, a hydrocarbon group and a silicon-containing group, may be the same or different and may be bonded to each other to form a ring.

In the formulas [3] and [4], the hydrocarbon group is preferably an alkyl group of 1 to 20 carbon atoms, an arylalkyl group of 7 to 20 carbon atoms, an aryl group of 6 to 20 carbon atoms or an alkylaryl group of 7 to 20 carbon atoms, and may contain one or more ring structures. Examples of such groups include methyl, ethyl, n-propyl, isopropyl, 2-methylpropyl, 1,1-dimethylpropyl, 2,2-dimethylpropyl, 1,1-diethylpropyl, 1-ethyl-1-methylpropyl, 1,1,2,2-tetramethylpropyl, sec-butyl, tert-butyl, 1,1-dimethylbutyl, 1,1,3-trimethylbutyl, neopentyl, cyclohexylmethyl, cyclohexyl, 1-methyl-1-cyclohexyl, 1-adamantyl, 2-adamantyl, 2-methyl-2-adamantyl, menthyl, norbornyl, benzyl, 2-phenylethyl, 1-tetrahydronaphthyl, 1-methyl-1-tetrahydronaphthyl, phenyl, naphthyl and tolyl.

In the formulas [3] and [4], the silicon-containing hydrocarbon group is preferably an alkylsilyl or arylsilyl group having 1 to 4 silicon atoms and 3 to 20 carbon atoms. Examples of such groups include trimethylsilyl, tert-butyldimethylsilyl and triphenylsilyl.

In the present invention, $R^1$, $R^2$, $R^3$, $R^4$, $R^5$, $R^6$, $R^7$. $R^8$, $R^9$ and $R^{10}$ in the formula [3] are each selected from hydrogen, a hydrocarbon group and a silicon-containing hydrocarbon group, and they may be the same or different. Preferred examples of the hydrocarbon groups and the silicon-containing hydrocarbon groups include those previously described. $R^1$, $R^2$, $R^3$, $R^4$, $R^5$, $R^6$, $R^7$ and $R^8$ in the formula [4] are each selected from hydrogen, a hydrocarbon group and a silicon-containing hydrocarbon group, and they may be the same or different. Preferred examples of the hydrocarbon groups and the silicon-containing hydrocarbon groups include those previously described.

Neighboring substituents among $R^1$ to $R^{10}$ on the cyclopentadienyl rings in the formula [3] may be bonded to each other to form a ring. Examples of such substituted cyclopentadienyl groups include indenyl, 2-methylindenyl, tetrahydroindenyl, 2-methyltetrahydroindenyl, 2,4,4-trimethyltetrahydroindenyl, fluorenyl, benzofluorenyl, dibenzofluorenyl, octahydrodibenzofluorenyl and octamethyloctahydrodibenzofluorenyl. Neighboring substituents among $R^1$ to $R^8$ on the cyclopentadienyl rings in the formula [4] may be bonded to each other to form a ring. Examples of such substituted cyclopentadienyl groups include indenyl, 2-methylindenyl, tetrahydroindenyl, 2-methyltetrahydroindenyl, 2,4,4-trimethyltetrahydroindenyl, fluorenyl, benzofluorenyl, dibenzofluorenyl, octahydrodibenzofluorenyl and octamethyloctahydrodibenzofluorenyl.

In the present invention, M in the formulas [3] and [4] is zirconium, titanium or hafnium.

X is a group or an atom selected from a halogen, a hydrogen atom, a hydrocarbon group of 1 to 10 carbon atoms, a neutral, conjugated or non-conjugated diene of 10 or less carbon atoms, an anionic ligand and a neutral ligand capable of coordination with a lone pair, and each X is the same or different. Examples of the halogens are fluorine, chlorine, bromine and iodine. Examples of the hydrocarbon groups include methyl, ethyl, n-propyl, isopropyl, 2-methylpropyl, 1,1-dimethylpropyl, 2,2-dimethylpropyl, 1,1-diethylpropyl, 1-ethyl-1-methylpropyl, 1,1,2,2-tetramethylpropyl, sec-butyl, tert-butyl, 1,1-dimethylbutyl, 1,1,3-trimethylbutyl, neopentyl, cyclohexylmethyl, cyclohexyl and 1-methyl-1-cyclohexyl. Examples of the neutral, conjugated or non-conjugated dienes of 10 or less carbon atoms include s-cis- or s-trans-$\eta^4$-1,3-butadiene, s-cis- or s-trans-$\beta^4$-1,4-diphenyl-1,3-butadiene, s-cis- or s-trans-$\eta^4$-3-methyl-1,3-pentadiene, s-cis- or s-trans-$\eta^4$-1,4-dibenzyl-1,3-butadiene, s-cis- or s-trans-$\eta^4$-2,4-hexadiene, s-cis- or s-trans-$\eta^4$-1,3-pentadiene, s-cis- or s-trans-$\eta^4$-1,4-ditolyl-1,3-butadiene, and s-cis- or s-trans-$\eta^4$-1,4-bis(trimethylsilyl)-1,3-butadiene. Examples of the anionic ligands include alkoxy groups, such as methoxy, tert-butoxy and phenoxy; carboxylate groups, such as acetate and benzoate; and sulfonate groups, such as mesylate and tosylate. Examples of the neutral ligands capable of coordination with a lone pair include organic phosphorus compounds, such as trimethylphosphine, triethylphosphine, triphenylphosphine and diphenylmethylphsophine; and ethers, such as tetrahydrofuran, diethyl ether, dioxane and 1,2-dimethoxyethane. Each X may be the same or different. n is an integer of 1 or greater and is a number of X.

Of the compounds represented by the formula [4], a preferred compound has a structure represented by the following formula [5] or [6].

[5]

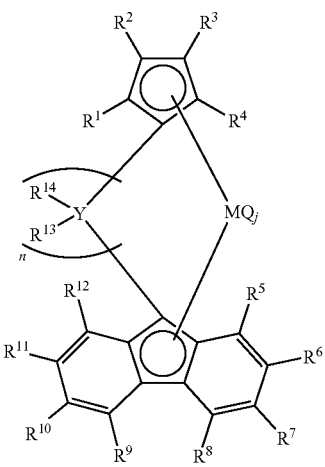

In the above formula, $R^1$, $R^2$, $R^3$, $R^4$, $R^5$, $R^6$, $R^7$, $R^8$, $R^9$, $R^{10}$, $R^{11}$, $R^{12}$, $R^{13}$ and $R^{14}$ are each selected from hydrogen, a hydrocarbon group and a silicon-containing hydrocarbon group and may be the same or different, and neighboring substituents among $R^1$ to $R^{14}$ may be bonded to each other to form a ring. M is zirconium, titanium or hafnium. Y is a Group 14 atom. Q is selected from a halogen, a hydrogen atom, a hydrocarbon group of 1 to 10 carbon atoms, a neutral, conjugated or non-conjugated diene of 10 or less carbon atoms, an anionic ligand and a neutral ligand capable of coordination with a lone pair, and each Q may be the same or different. n is an integer of 2 or 3, and j is an integer of 1 to 4.

[6]

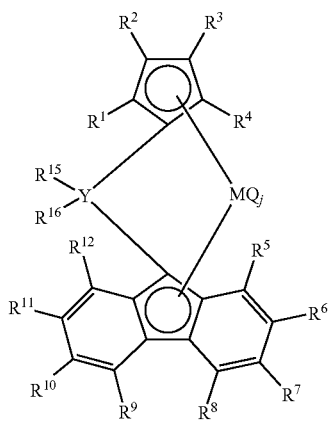

In the above formula, $R^1$, $R^2$, $R^3$, $R^4$, $R^5$, $R^6$, $R^7$, $R^8$, $R^9$, $R^{10}$, $R^{11}$, $R^{12}$, $R^{15}$ and $R^{16}$ are each selected from a hydrogen atom, a hydrocarbon group and a silicon-containing hydrocarbon group and may be the same or different, and neighboring groups among them may be bonded to each other to form a ring. $R^6$ and $R^{11}$ are the same atoms or groups selected from hydrogen, a hydrocarbon group and a silicon-containing hydrocarbon group and may be bonded to each other to form a ring; $R^7$ and $R^{10}$ are the same atoms or groups selected from hydrogen, a hydrocarbon group and a silicon-containing hydrocarbon group, and may be bonded to each other to form a ring; and $R^6$, $R^7$, $R^{10}$ and $R^{11}$ are not hydrogen atoms at the same time. $R^{15}$ and $R^{16}$ may be the same or different. M is zirconium, titanium or hafnium, preferably Zr or Hf. Y is carbon or silicon. Q is selected from a halogen, a hydrocarbon group, an anionic ligand and a neutral ligand capable of coordination with a lone pair, and each Q may be the same or different. j is an integer of 1 to 4.

Next, the chemical-structural features of the bridged metallocene compound, namely, a cyclopentadienyl group, a fluorenyl group and a bridged portion, and other features are described in order, and thereafter, preferred examples of the bridged metallocene compounds having those features are described.

Cyclopentadienyl Group

The cyclopentadienyl group may be substituted or may not be substituted. The cyclopentadienyl group which may be substituted or may not be substituted means a cyclopentadienyl group wherein $R^1$, $R^2$, $R^3$ and $R^4$ possessed by the cyclopentadienyl group portion in the formulas [5] and [6] are all hydrogen atoms or at least one of $R^1$, $R^2$, $R^3$ and $R^4$ is substituted with a hydrocarbon group (f1), preferably a hydrocarbon group (f1') having 1 to 20 carbon atoms in all, or a silicon-containing group (f2), preferably a silicon-containing group (f2') having 1 to 20 carbon atoms in all. The hydrocarbon group having 1 to 20 carbon atoms in all is an alkyl, alkenyl, alkynyl or aryl group constituted of carbon and hydrogen only. In such groups, a group wherein arbitrary two neighboring hydrogen atoms are simultaneously substituted to form an alicyclic or aromatic ring is included. In the hydrocarbon groups (f1') having 1 to 20 carbon atoms in all, a hetero atom-containing hydrocarbon group wherein parts of hydrogen atoms directly bonded to these carbon atoms are substituted with halogen atoms, oxygen-containing groups, nitrogen-containing groups or silicon-containing groups and a group wherein arbitrary two neighboring hydrogen atoms form an alicyclic group are included. Examples of such groups (f1') include straight-chain hydrocarbon groups, such as methyl, ethyl, n-propyl, allyl, n-butyl, n-pentyl, n-hexyl, n-heptyl, n-octyl, octyl, n-nonyl and n-decanyl; branched hydrocarbon groups, such as isopropyl, t-butyl, amyl, 3-methylpentyl, 1,1-diethylpropyl, 1,1-dimethylbutyl, 1-methyl-1-propylbutyl, 1,1-propylbutyl, 1,1-dimethyl-2-methylpropyl and 1-methyl-1-isopropyl-2-methylpropyl; cyclic saturated hydrocarbon groups, such as cyclopentyl, cyclohexyl, cycloheptyl, cyclooctyl, norbornyl and adamantyl; cyclic unsaturated hydrocarbon groups, such as phenyl, naphthyl, biphenyl, phenanthryl and anthracenyl, and their nucleus alkyl substituted groups; saturated hydrocarbon groups substituted with aryl groups, such as benzyl and cumyl; and hetero atom-containing hydrocarbon groups, such as methoxy, ethoxy, phenoxy, N-methylamino, trifluoromethyl, tribromomethyl, pentafluoroethyl and pentafluorophenyl.

The silicon-containing group (f2) is, for example, a group wherein cyclic carbon of the cyclopentadienyl group is covalent bonded directly to a silicon atom and is specifically an alkylsilyl group or an arylsilyl group. The silicon-containing group (f2') having 1 to 20 carbon atoms in all is, for example, a trimethylsilyl group or a triphenylsilyl group.

Fluorenyl Group

The fluorenyl group in the formula [5] may be substituted or may not be substituted. The fluorenyl group which may be substituted or may not be substituted means a fluorenyl group wherein $R^5$, $R^6$, $R^7$, $R^8$, $R^9$, $R^{10}$, $R^{11}$ and $R^{12}$ possessed by the fluorenyl group portion in the formula [5] are all hydrogen atoms or at least one of $R^5$, $R^6$, $R^7$, $R^8$, $R^9$, $R^{10}$, $R^{11}$ and $R^{12}$ is substituted with a hydrocarbon group (f1), preferably a hydrocarbon group (f1') having 1 to 20 carbon atoms in all, or a silicon-containing group (f2), preferably a silicon-containing group (f2') having 1 to 20 carbon atoms in all. From the viewpoint of synthesis of the α-olefin (co)polymer, important points in the fluorenyl group portion of the chemical-structural formula represented by the formula [5] are: $R^6$ and $R^{11}$ in the formula [5] are the same atoms or groups selected from hydrogen, the hydrocarbon group (f1) and the silicon-containing hydrocarbon group (f2), and may be bonded to each other to form a ring; $R^7$ and $R^{10}$ are the same atoms or groups selected from hydrogen, the hydrocarbon group (f1) and the silicon-containing hydrocarbon group (f2), and may be bonded to each other to form a ring; and $R^6$, $R^7$, $R^{10}$ and $R^{11}$ are not hydrogen atoms at the same time. Of these, preferable is that none of $R^6$, $R^7$, $R^{10}$ and $R^{11}$ are hydrogen atoms, and more preferable is that "$R^6$ and $R^7$", and "$R^{10}$ and $R^{11}$" are bonded to each other to from a ring, respectively. By virtue of this, a narrow molecular weight distribution and reduction of a content of the unsaturated groups at the molecular one ends have become possible in the synthesis of the α-olefin (co)polymer of the present invention. A preferred example of the hydrocarbon group (f1) is the aforesaid hydrocarbon group (f1') having 1 to 20 carbon atoms in all, and a preferred example of the silicon-containing group (f2) is the aforesaid silicon-containing group (f2') having 1 to 20 carbon atoms in all.

In the fluorenyl group portion in the chemical-structural formula represented by the formula [6], important points are: $R^6$ and $R^{11}$ in the formula [6] are the same atoms or groups selected from hydrogen, the hydrocarbon group (f1) and the silicon-containing hydrocarbon group (f2), and may be bonded to each other to form a ring; $R^7$ and $R^{10}$ are the same atoms or groups selected from hydrogen, the hydrocarbon group (f1) and the silicon-containing hydrocarbon group (f2), and may be bonded to each other to form a ring; and $R^6$, $R^7$, $R^{10}$ and $R^{11}$ are not hydrogen atoms at the same time. Of these, preferable is that none of $R^6$, $R^7$, $R^{10}$ and $R^{11}$ are hydrogen atoms, and more preferable is that "$R^6$ and $R^7$", and "$R^{10}$ and $R^{11}$" are bonded to each other to from a ring, respectively, from the viewpoint of the synthesis of the α-olefin (co)polymer of the present invention. By virtue of this, a narrow molecular weight distribution and reduction of a content of the unsaturated groups at the molecular one ends have become possible in the synthesis of the α-olefin (co)polymer of the present invention. A preferred example of the hydrocarbon group (f1) is the aforesaid hydrocarbon group (f1') having 1 to 20 carbon atoms in all, and a preferred example of the silicon-containing group (f2) is the aforesaid silicon-containing group (f2') having 1 to 20 carbon atoms in all.

More specifically, fluorene is unsubstituted fluorene, 3,6-di-substituted fluorene, 2,7-di-substituted fluorene or 2,3,6,7-tetra-substituted fluorene. When neighboring two substituents among $R^5$ to $R^{12}$ on the fluorene ring are bonded to each other to form a ring, examples of the fluorenyl groups include benzofluorenyl, dibenzofluorenyl, octahydrodibenzofluorenyl and octamethyloctahydrodibenzofluorenyl. The 2-position, 3-position, 6-position and 7-position on the fluorene ring correspond to $R^6$, $R^7$, $R^{10}$ and $R^{11}$, respectively.

Covalent Bond Bridging

In the main chain of the bond between the cyclopentadienyl group and the fluorenyl group in the formulas [5] and [6], the bridging atom Y is a Group 14 atom, preferably carbon or silicon.

In the formula [5], n is an integer of 2 or 3, preferably 2. In the present invention, it is important that the bridging atom Y has $R^{13}$ and $R^{14}$ which may be the same as or different from each other. $R^{13}$ and $R^{14}$ are each a hydrogen atom, the aforesaid hydrocarbon group (f1') having 1 to 20 carbon atoms in all, the aforesaid silicon-containing group (f2') having 1 to 20 carbon atoms in all, or a halogen atom.

By virtue of the above, a narrow molecular weight distribution and reduction of a content of the unsaturated groups at the molecular one ends have become possible in the synthesis of the α-olefin (co)polymer of the present invention.

In the formula [6], the bridging atom Y has $R^{15}$ and $R^{16}$ which may be the same as or different from each other. $R^{15}$ and $R^{16}$ are each the aforesaid hydrocarbon group (f1') having 1 to 20 carbon atoms in all, the aforesaid silicon-containing group (f2') having 1 to 20 carbon atoms in all, or a halogen atom. In the present invention, it is important that the bridging atom Y in the covalent bond bridged portion has groups of "$R^{15}$ and $R^{16}$" which may be the same as or different from each other. Preferable is an aryl group or a substituted aryl group. Examples of such groups include phenyl, naphthyl, anthracenyl, and their substituted groups wherein one or more aromatic hydrogen atoms ($sp^2$ type hydrogen atoms) are substituted with substituents. Examples of the substituents include the aforesaid hydrocarbon group (f1') having 1 to 20 carbon atoms in all, the aforesaid silicon-containing group (f2') having 1 to 20 carbon atoms and a halogen atom. As the aryl groups, preferable are phenyl, tolyl, t-butylphenyl, dimethylphenyl, biphenyl, cyclohexylphenyl, (trifluoromethyl)phenyl, bi(trifluoromethyl)phenyl, and groups wherein halogen atoms are introduced into the substituents, such as chlorophenyl and dichlorophenyl. Particularly preferable are substituted phenyl groups wherein the above substituents are present at the meta position and/or the para position. As the bridged metallocene compound for the present invention, a compound wherein $R^{15}$ and $R^{16}$ are the same with each other is preferably used from the viewpoint of easeness for production.

With respect to the constituents of the olefin polymerization catalyst for the present invention, when the transition metal compound of the formula [6] is used as the periodic table Group 4 transition metal compound (A), it is preferable to use, as the compound (B), the organometallic compound (B-1) and/or the organoaluminum compound (B-2) and/or the compound (B-4) which reacts with the Group 4 transition metal compound (A) to form an ion pair. Especially in the case where $R^{15}$ and $R^{16}$ in the formula [6] are each a phenyl group, the organometallic compound (B-1) and/or the organoaluminum compound (B-2) and/or the compound (B-4) which reacts with the Group 4 transition metal compound (A) to form an ion pair is used as the compound (B) that is a constituent of the olefin polymerization catalyst for the present invention, and the organoaluminum oxy-compound (B-3) is not used.

Other Features of Bridged Metallocene Compound

In the formulas [5] and [6], Q is selected from a halogen, a hydrocarbon group of 1 to 10 carbon atoms, a neutral, conjugated or non-conjugated diene of 10 or less carbon atoms, an anionic ligand and a neutral ligand capable of coordination with a lone pair, and each Q may be the same or different. Examples of the halogens are fluorine, chlorine, bromine and iodine. Examples of the hydrocarbon groups include methyl, ethyl, n-propyl, isopropyl, 2-methylpropyl, 1,1-dimethylpropyl, 2,2-dimethylpropyl, 1,1-diethylpropyl, 1-ethyl-1-methylpropyl, 1,1,2,2-tetramethylpropyl, sec-butyl, tert-butyl, 1,1-dimethylbutyl, 1,1,3-trimethylbutyl, neopentyl, cyclohexylmethyl, cyclohexyl and 1-methyl-1-cyclohexyl. Examples of the neutral, conjugated or non-conjugated dienes of 10 or less carbon atoms include s-cis- or s-trans-$\eta^4$-1,3-butadiene, s-cis- or s-trans-$\eta^4$-1,4-diphenyl-1,3-butadiene, s-cis- or s-trans-$\eta^4$-3-methyl-1,3-pentadiene, s-cis- or s-trans-$\eta^4$-1,4-dibenzyl-1,3-butadiene, s-cis- or s-trans-$\eta^4$-2,4-hexadiene, s-cis- or s-trans-$\eta^4$-1,3-pentadiene, s-cis- or s-trans-$\eta^4$-1,4-ditolyl-1,3-butadiene, and s-cis- or s-trans-$\eta^4$-1,4-bis(trimethylsilyl)-1,3-butadiene. Examples of the anionic ligands include alkoxy groups, such as methoxy, tert-butoxy and phenoxy; carboxylate groups, such as acetate and benzoate; and sulfonate groups, such as mesylate and tosylate. Examples of the neutral ligands capable of coordination with a lone pair include organic phosphorus compounds, such as trimethylphosphine, triethylphosphine, triphenylphosphine and diphenylmethylphsophine; and ethers, such as tetrahydrofuran, diethyl ether, dioxane and 1,2-dimethoxyethane. j is an integer of 1 to 4, and when j is 2 or more, each Q may be the same or different.

Preferred Bridged Metallocene Compound and Examples Thereof

Examples of the Group 4 transition metal compounds represented by the formula [3], [4], [5] or [6] are given below, but the scope of the present invention is not particularly restricted by those examples.

Examples of the compounds represented by the formula [3] include cyclopentadienyl trichloride, cyclopentadienylzirconium trichloride, bis(cyclopentadienyl)titanium dichloride, bis(cyclopentadienyl)zirconium dichloride, bis(pentamethylcyclopentadienyl)zirconium dichloride, (cyclopentadienyl)(pentamethylcyclopentadienyl)zirconium dichloride, bis(methylcyclopentadienyl)zirconium dichloride, bis(ethylcyclopentadienyl)zirconium dichloride, bis(propylcyclopentadienyl)zirconium dichloride, bis(butylcyclopentadienyl)zirconium dichloride such as bis(n-butylcyclopentadienyl)zirconium dichloride, bis(dimethlcyclopentadienyl)zirconium dichloride such as bis(1,3-dimethlcyclopentadienyl)zirconium dichloride, bis(diethylcyclopentadienyl)zirconium dichloride such as bis(1,3-diethylcyclopentadienyl)zirconium dichloride, bis(methylethylcyclopentadienyl)zirconium dichloride, bis(methylpropylcyclopentadienyl)zirconium dichloride such as bis(1-methyl-3-n-propylcyclopentadienyl)zirconium dichloride, and bis(methylbutylcyclopentadienyl)zirconium dichloride such as bis(1-methyl-3-n-butylcyclopentadienyl)zirconium dichloride.

Examples of the compounds represented by the formula [4] include ethylenebis(indenyl)zirconium dichloride, ethylenebis(1-indenyl)titanium dichloride, ethylenebis(4,5,6,7-tetrahydroindenyl)zirconium dichloride, dimethylsilylenebis(methylcyclopentadienyl)zirconium dichloride, dimethylsilylenebis(dimethylcyclopentadienyl)zirconium dichloride, dimethylsilylenebis(di-tert-butylcyclopentadienyl)zirconium dichloride, dimethylsilylenebis(indenyl)zirconium dichloride, dimethylsilylenebis(2-methylindenyl)zirconium dichloride, dimethylsilylenebis(2-methyl-4,5-benzoindenyl)zirconium dichloride, dimethylsilylenebis(2-methyl-4-phenylindenyl)zirconium dichloride, dimethylsilylenebis(2-methyl-4-naphthylindenyl)zirconium dichloride, dimethylethylenebis(2-methylindenyl)zirconium dichloride, dimethylethylenebis(2-methyl-4,5-benzoindenyl)zirconium dichloride, dimethylethylenebis(2-methyl-4-phenylindenyl)zirconium dichloride, and dimethylethylenebis(2-methyl-4-naphthylindenyl)zirconium dichloride.

Examples of the compounds represented by the formula [5] include ethylene(cyclopentadienyl) (fluorenyl)zirconium dichloride, ethylene (cyclopentadienyl) (3,6-di-tert-butylfluorenyl)zirconium dichloride, ethylene (cyclopentadienyl) (2,7-di-tert-butylfluorenyl)zirconium dichloride, ethylene (cyclopentadienyl)-(octamethyloctahydrodibenzofluorenyl)zirconium dichloride, ethylene(cyclopentadienyl)(benzofluorenyl)zirconium dichloride, ethylene (cyclopentadienyl) (dibenzofluorenyl)zirconium dichloride, ethylene (cyclopentadienyl)-(octahydrodibenzofluorenyl)zirconium dichloride, ethylene (cyclopentadienyl)(2,7-diphenyl-3,6-di-tert-butylfluorenyl) zirconium dichloride, ethylene(cyclopentadienyl)(2,7-dimethyl-3,6-di-tert-butylfluorenyl)zirconium dichloride, ethylene(cyclopentadienyl)(1,1',3,6,8,8'-hexamethyl-2,7-dihydrodicyclopentafluorenyl)zirconium dichloride, ethylene (cyclopentadienyl)(1,3,3',6,6',8-hexamethyl-2,7-dihydrodicyclopentafluorenyl)zirconium dichloride, ethylene (cyclopentadienyl)(2,7-(trimethylphenyl)-3,6-di-tert-butylfluorenyl)zirconium dichloride, ethylene (cyclopentadienyl)(2,7-(dimethylphenyl)-3,6-di-tert-butylfluorenyl)zirconium dichloride, ethylene (cyclopentadienyl)(2,3,6,7-tetra-tert-butylfluorenyl) zirconium dichloride, propylene(cyclopentadienyl) (fluorenyl)zirconium dichloride, propylene (cyclopentadienyl)(3,6-di-tert-butylfluorenyl)zirconium dichloride, propylene(cyclopentadienyl)(2,7-di-tert-butylfluorenyl)zirconium dichloride, propylene(cyclopentadienyl)-(octamethyloctahydrodibenzofluorenyl)zirconium dichloride, propylene(cyclopentadienyl)(benzofluorenyl)zirconium dichloride, propylene(cyclopentadienyl)(dibenzofluorenyl)zirconium dichloride, propylene(cyclopentadienyl)-(octahydrodibenzofluorenyl)zirconium dichloride, propylene(cyclopentadienyl)(2,7-diphenyl-3,6-di-tert-butylfluorenyl)zirconium dichloride, propylene(cyclopentadienyl)(2,7-dimethyl-3,6-di-tert-butylfluorenyl)zirconium dichloride, tetramethyldisilylene(cyclopentadienyl)-(fluorenyl)zirconium dichloride, tetramethyldisilylene(cyclopentadienyl)(3,6-di-tert-butylfluorenyl)zirconium dichloride, tetramethyldisilylene(cyclopentadienyl)(2,7-di-tert-butylfluorenyl)zirconium dichloride, tetramethyldisilylene(cyclopentadienyl)-(octamethyloctahydrodibenzofluorenyl) zirconium dichloride, tetramethyldisilylene(cyclopentadienyl)-(benzofluorenyl)zirconium dichloride, tetramethyldisilylene(cyclopentadienyl)(dibenzofluorenyl)zirconium dichloride, tetramethyldisilylene (cyclopentadienyl)-(octahydrodibenzofluorenyl) zirconium dichloride, tetramethyldisilylene(cyclopentadienyl)(2,7-diphenyl-3,6-di-tert-butylfluorenyl)zirconium dichloride, tetramethyldisilylene (cyclopentadienyl)(2,7-dimethyl-3,6-di-tert-butylfluorenyl) zirconium dichloride, ethylene(methyl-tert-butylcyclopentadienyl)(fluorenyl)zirconium dichloride, ethylene(methyl-tert-butylcyclopentadienyl)(3,6-di-tert-butylfluorenyl)zirconium dichloride, ethylene(methyl-tert-butylcyclopentadienyl) (2,7-di-tert-butylfluorenyl)zirconium dichloride, ethylene(methyl-tert-butylcyclopentadienyl)-(octamethyloctahydrodibenzofluorenyl)zirconium dichloride, ethylene(methyl-tert-butylcyclopentadienyl)(benzofluorenyl)zirconium dichloride, ethylene(methyl-tert-butylcyclopentadienyl)(dibenzofluorenyl)zirconium dichloride, ethylene(methyl-tert-butylcyclopentadienyl)-(octahydrodibenzofluorenyl)zirconium dichloride, ethylene (methyl-tert-butylcyclopentadienyl)(2,7-diphenyl-3,6-di-tert-butylfluorenyl)zirconium dichloride, ethylene(methyl-tert-butylcyclopentadienyl)(2,7-dimethyl-3,6-di-tert-butylfluorenyl)zirconium dichloride, ethylene(tert-butylcyclopentadienyl)(fluorenyl)zirconium dichloride, ethylene(tert-butylcyclopentadienyl)(3,6-di-tert-butylfluorenyl)zirconium dichloride, ethylene(tert-butylcyclopentadienyl)(2,7-di-tert-butylfluorenyl)zirconium dichloride, ethylene(tert-butylcyclopentadienyl)-(octamethyloctahydrodibenzofluorenyl)zirconium dichloride, ethylene(tert-butylcyclopentadienyl)(benzofluorenyl)zirconium dichloride, ethylene(tert-butylcyclopentadienyl)(dibenzofluorenyl)zirconium dichloride, ethylene(tert-butylcyclopentadienyl)-(octahydrodibenzofluorenyl)zirconium dichloride, ethylene(tert-butylcyclopentadienyl)(2,7-diphenyl-3,6-di-tert-butylfluorenyl)zirconium dichloride, and ethylene(tert-butylcyclopentadienyl)(2,7-dimethyl-3,6-di-tert-butylfluorenyl)zirconium dichloride.

Examples of the compounds represented by the formula [6] include isopropylidene(cyclopentadienyl)(fluorenyl)zirconium dichloride, isopropylidene(cyclopentadienyl)(3,6-di-tert-butylfluorenyl)zirconium dichloride, isopropylidene(cyclopentadienyl)(2,7-di-tert-butylfluorenyl)zirconium dichloride, isopropylidene(cyclopentadienyl)-(octamethyloctahydrodibenzofluorenyl)zirconium dichloride, isopropylidene(cyclopentadienyl)(benzofluorenyl)zirconium dichloride, isopropylidene(cyclopentadienyl)-(dibenzofluorenyl)zirconium dichloride, isopropylidene(cyclopentadienyl)-(octahydrodibenzofluorenyl)zirconium dichloride, isopropylidene(cyclopentadienyl)(2,7-diphenyl-3,6-di-tert-butylfluorenyl)zirconium dichloride, isopropylidene(cyclopentadienyl)(2,7-dimethyl-3,6-di-tert-butylfluorenyl)zirconium dichloride, isopropylidene(cyclopentadienyl)(1,1',3,6,8,8'-hexamethyl-2,7-dihydrodicyclopentafluorenyl)zirconium dichloride, isopropylidene(cyclopentadienyl)(1,3,3',6,6',8-hexamethyl-2,7-dihydrodicyclopentafluorenyl)zirconium dichloride, isopropylidene(cyclopentadienyl)(2,7-(trimethylphenyl)-3,6-di-tert-butylfluorenyl)zirconium dichloride, isopropylidene(cyclopentadienyl)(2,7-(dimethylphenyl)-3,6-di-tert-butylfluorenyl)zirconium dichloride, isopropylidene(cyclopentadienyl)(2,3,6,7-tetra-tert-butylfluorenyl)zirconium dichloride, isopropylidene(methylcyclopentadienyl)-(fluorenyl)zirconium dichloride, isopropylidene(tert-butylcyclopentadienyl)(fluorenyl)zirconium dichloride, isopropylidene(methyl-tert-butylcyclopentadienyl)(fluorenyl)zirconium dichloride, cyclohexylidene(cyclopentadienyl)(fluorenyl)zirconium dichloride, cyclohexylidene(cyclopentadienyl)(3,6-di-tert-butylfluorenyl)zirconium dichloride, cyclohexylidene(cyclopentadienyl)(2,7-di-tert-butylfluorenyl)zirconium dichloride, cyclohexylidene(cyclopentadienyl)-(octamethyloctahydrodibenzofluorenyl)zirconium dichloride, cyclohexylidene(cyclopentadienyl)-(benzofluorenyl)zirconium dichloride, cyclohexylidene(cyclopentadienyl)-(dibenzofluorenyl)zirconium dichloride, cyclohexylidene(cyclopentadienyl)-(octahydrodibenzofluorenyl)zirconium dichloride, cyclohexylidene(cyclopentadienyl)(2,7-diphenyl-3,6-di-tert-butylfluorenyl)zirconium dichloride, cyclohexylidene(cyclopentadienyl)(2,7-dimethyl-3,6-di-tert-butylfluorenyl)zirconium dichloride, cyclohexylidene(cyclopentadienyl)(1,1',3,6,8,8'-hexamethyl-2,7-dihydrodicyclopentafluorenyl)zirconium dichloride, cyclohexylidene(cyclopentadienyl)(1,3,3',6,6',8-hexamethyl-2,7-dihydrodicyclopentafluorenyl)zirconium dichloride, cyclohexylidene(cyclopentadienyl)(2,7-(trimethylphenyl)-3,6-di-tert-butylfluorenyl)zirconium dichloride, cyclohexylidene(cyclopentadienyl)(2,7-(dimethylphenyl)-3,6-di-tert-butylfluorenyl)zirconium dichloride, cyclohexylidene(cyclopentadienyl)(2,3,6,7-tetra-tert-butylfluorenyl)zirconium dichloride, adamantylidene(cyclopentadienyl)(fluorenyl)zirconium dichloride, adamantylidene(cyclopentadienyl)(3,6-di-tert-butylfluorenyl)zirconium dichloride, adamantylidene(cyclopentadienyl)(2,7-di-tert-butylfluorenyl)zirconium dichloride, adamantylidene(cyclopentadienyl)-(octamethyloctahydrodibenzofluorenyl)zirconium dichloride, adamantylidene(cyclopentadienyl)(benzofluorenyl)zirconium dichloride, adamantylidene(cyclopentadienyl)-(dibenzofluorenyl)zirconium dichloride, adamantylidene(cyclopentadienyl)-(octahydrodibenzofluorenyl)zirconium dichloride, adamantylidene(cyclopentadienyl)(2,7-diphenyl-3,6-di-tert-butylfluorenyl)zirconium dichloride, adamantylidene(cyclopentadienyl)(2,7-dimethyl-3,6-di-tert-butylfluorenyl)zirconium dichloride, adamantylidene(cyclopentadienyl)(1,1',3,6,8,8'-hexamethyl-2,7-dihydrodicyclopentafluorenyl)zirconium dichloride, adamantylidene(cyclopentadienyl)(1,3,3',6,6',8-hexamethyl-2,7-dihydrodicyclopentafluorenyl)zirconium dichloride, adamantylidene(cyclopentadienyl)(2,7-(trimethylphenyl)-3,6-di-tert-butylfluorenyl)zirconium dichloride, adamantylidene(cyclopentadienyl)(2,7-(dimethylphenyl)-3,6-di-tert-butylfluorenyl)zirconium dichloride, adamantylidene(cyclopentadienyl)(2,3,6,7-tetra-tert-butylfluorenyl)zirconium dichloride, dimethylsilylene(cyclopentadienyl)(fluorenyl)zirconium dichloride, dimethylsilylene(cyclopentadienyl)(3,6-di-tert-butylfluorenyl)zirconium dichloride, dimethylsilylene(cyclopentadienyl)(2,7-di-tert-butylfluorenyl)zirconium dichloride, dimethylsilylene(cyclopentadienyl)-(octamethyloctahydrodibenzofluorenyl)zirconium dichloride, dimethylsilylene(cyclopentadienyl)-(benzofluorenyl)zirconium dichloride, dimethylsilylene(cyclopentadienyl)-(dibenzofluorenyl)zirconium dichloride, dimethylsilylene(cyclopentadienyl)-(octahydrodibenzofluorenyl)zirconium dichloride, dimethylsilylene(cyclopentadienyl)(2,7-diphenyl-3,6-di-tert-butylfluorenyl)zirconium dichloride, dimethylsilylene(cyclopentadienyl)(2,7-dimethyl-3,6-di-tert-butylfluorenyl)zirconium dichloride, dimethylsilylene(cyclopentadienyl)(1,1',3,6,8,8'-hexamethyl-2,7-dihydrodicyclopentafluorenyl)zirconium dichloride, dimethylsilylene(cyclopentadienyl)(1,3,3',6,6',8-hexamethyl-2,7-dihydrodicyclopentafluorenyl)zirconium dichloride, dimethylsilylene(cyclopentadienyl)(2,7-(trimethylphenyl)-3,6-di-tert-butylfluorenyl)zirconium dichloride, dimethylsilylene(cyclopentadienyl)(2,7-(dimethylphenyl)-3,6-di-tert-butylfluorenyl)zirconium dichloride, dimethylsilylene(cyclopentadienyl)(2,3,6,7-tetra-tert-butylfluorenyl)zirconium dichloride, diphenylmethylene(cyclopentadienyl)(2,7-di-tert-butylfluorenyl)zirconium dichloride, diphenylmethylene(cyclopentadienyl)(3,6-di-tert-butylfluorenyl)zirconium dichloride, diphenylmethylene(cyclopentadienyl)-(octamethyloctahydrodibenzofluorenyl)zirconium dichloride, diphenylmethylene(cyclopentadienyl)-(octamethyltetrahydrodicyclopentafluorenyl)zirconium dichloride, diphenylmethylene(cyclopentadienyl)(dibenzofluorenyl)-zirconium dichloride, diphenylmethylene(cyclopentadienyl)(1,1',3,6,8,8'-hexamethyl-2,7-dihydrodicyclopentafluorenyl)zirconium dichloride, diphenylmethylene(cyclopentadienyl)(1,3,3',6,6',8-hexamethyl-2,7-dihydrodicyclopentafluorenyl)zirconium dichloride, diphenylmethylene(cyclopentadienyl)(2,7-diphenyl-3,6-di-tert-butylfluorenyl)zirconium dichloride, diphenylmethylene(cyclopentadienyl)(2,7-dimethyl-3,6-di-tert-butylfluorenyl)zirconium dichloride, diphenylmethylene(cyclopentadienyl)(2,7-(trimethylphenyl)-3,6-di-tert-butylfluorenyl)zirconium dichloride, diphenylmethylene(cyclopentadienyl)(2,7-(dimethylphenyl)-3,6-di-tert-butylfluorenyl)zirconium dichloride, diphenylmethylene(cyclopentadienyl)(2,3,6,7-tetra-tert-butylfluorenyl)zirconium dichloride, di(p-tolyl)methylene(cyclopentadienyl) (2,7-di-tert-butylfluorenyl) zirconium dichloride, di(p-tolyl)methylene (cyclopentadienyl) (3,6-di-tert-butylfluorenyl)zirconium dichloride, di(p-tolyl)methylene (cyclopentadienyl)-(octamethyloctahydrodibenzofluorenyl)zirconium dichloride, di(p-tolyl)methylene(cyclopentadienyl)-(octamethyltetrahydrodicyclopentafluorenyl)zirconium dichloride, di(p-tolyl) methylene(cyclopentadienyl)-(dibenzofluorenyl)zirconium dichloride, di(p-tolyl)methylene(cyclopentadienyl) (1,1',3,6,8,8'-hexamethyl-2,7-dihydrodicyclopentafluorenyl)zirconium dichloride, di(p-tolyl)methylene(cyclopentadienyl) (1,3,3',6,6',8-hexamethyl-2,7-dihydrodicyclopentafluorenyl)zirconium dichloride, di(p-tolyl)methylene(cyclopentadienyl)(2,7-diphenyl-3,6-di-tert-butylfluorenyl)zirconium dichloride, di(p-tolyl)methylene(cyclopentadienyl)(2,7-dimethyl-3,6-di-tert-butylfluorenyl)zirconium dichloride, di(p-tolyl)methylene(cyclopentadienyl)(2,7-(trimethylphenyl)-3,6-di-tert-butylfluorenyl)zirconium dichloride, di(p-tolyl) methylene(cyclopentadienyl)(2,7-(dimethylphenyl)-3,6-di-tert-butylfluorenyl)zirconium dichloride, di(p-tolyl) methylene(cyclopentadienyl)(2,3,6,7-tetra-tert-butylfluorenyl)zirconium dichloride, di(p-chlorophenyl) methylene(cyclopentadienyl)(2,7-di-tert-butylfluorenyl) zirconium dichloride, di(p-chlorophenyl)methylene (cyclopentadienyl)(3,6-di-tert-butylfluorenyl)zirconium dichloride, di(p-chlorophenyl)methylene(cyclopentadienyl)-(octamethyloctahydrodibenzofluorenyl)zirconium dichloride, di(p-chlorophenyl)methylene(cyclopentadienyl)-(octamethyltetrahydrodicyclopentafluorenyl)zirconium dichloride, di(p-chlorophenyl)methylene(cyclopentadienyl)-(dibenzofluorenyl)zirconium dichloride, di(p-chlorophenyl) methylene(cyclopentadienyl)(1,1',3,6,8,8'-hexamethyl-2,7-dihydrodicyclopentafluorenyl)zirconium dichloride, di(p-chlorophenyl)methylene(cyclopentadienyl)(1,3,3',6,6',8-hexamethyl-2,7-dihydrodicyclopentafluorenyl)zirconium dichloride, di(p-chlorophenyl)methylene(cyclopentadienyl) (2,7-diphenyl-3,6-di-tert-butylfluorenyl)zirconium dichloride, di(p-chlorophenyl)methylene(cyclopentadienyl)(2,7-dimethyl-3,6-di-tert-butylfluorenyl)zirconium dichloride, di(p-chlorophenyl)methylene(cyclopentadienyl)(2,7-(trimethylphenyl)-3,6-di-tert-butylfluorenyl)zirconium dichloride, di(p-chlorophenyl)methylene(cyclopentadienyl)(2,7-(dimethylphenyl)-3,6-di-tert-butylfluorenyl)zirconium dichloride, di(p-chlorophenyl)methylene(cyclopentadienyl) (2,3,6,7-tetra-tert-butylfluorenyl)zirconium dichloride, di(m-chlorophenyl)methylene(cyclopentadienyl)(2,7-di-tert-butylfluorenyl)zirconium dichloride, di(m-chlorophenyl)methylene(cyclopentadienyl)(3,6-di-tert-butylfluorenyl)zirconium dichloride, di(m-chlorophenyl)methylene (cyclopentadienyl)-(octamethyloctahydrodibenzofluorenyl)zirconium dichloride, di(m-chlorophenyl)methylene (cyclopentadienyl)-(octamethyltetrahydrodicyclopentafluorenyl) zirconium dichloride, di(m-chlorophenyl)methylene (cyclopentadienyl)-(dibenzofluorenyl)zirconium dichloride, di(m-chlorophenyl)methylene(cyclopentadienyl)(1,1',3,6,8,8'-hexamethyl-2,7-dihydrodicyclopentafluorenyl)zirconium dichloride, di(m-chlorophenyl)methylene(cyclopentadienyl) (1,3,3',6,6',8-hexamethyl-2,7-dihydrodicyclopentafluorenyl)zirconium dichloride, di(m-chlorophenyl)methylene(cyclopentadienyl)(2,7-diphenyl-3,6-di-tert-butylfluorenyl) zirconium dichloride, di(m-chlorophenyl)methylene (cyclopentadienyl)(2,7-dimethyl-3,6-di-tert-butylfluorenyl) zirconium dichloride, di(m-chlorophenyl)methylene (cyclopentadienyl)(2,7-(trimethylphenyl)-3,6-di-tert-butylfluorenyl)zirconium dichloride, di(m-chlorophenyl) methylene(cyclopentadienyl)(2,7-(dimethylphenyl)-3,6-di-tert-butylfluorenyl)zirconium dichloride, di(m-chlorophenyl)methylene(cyclopentadienyl)(2,3,6,7-tetra-tert-butylfluorenyl)zirconium dichloride, di(p-bromophenyl) methylene(cyclopentadienyl)(2,7-di-tert-butylfluorenyl) zirconium dichloride, di(p-bromophenyl)methylene (cyclopentadienyl)(3,6-di-tert-butylfluorenyl)zirconium dichloride, di(p-bromophenyl)methylene(cyclopentadienyl)-(octamethyloctahydrodibenzofluorenyl)zirconium dichloride, di(p-bromophenyl)methylene(cyclopentadienyl)-(octamethyltetrahydrodicyclopentafluorenyl)zirconium dichloride, di(p-bromophenyl)methylene(cyclopentadienyl)-(dibenzofluorenyl)zirconium dichloride, di(p-bromophenyl)methylene(cyclopentadienyl)(1,1',3,6,8,8'-hexamethyl-2,7-dihydrodicyclopentafluorenyl)zirconium dichloride, di(p-bromophenyl)methylene(cyclopentadienyl) (1,3,3',6,6',8-hexamethyl-2,7-dihydrodicyclopentafluorenyl)zirconium dichloride, di(p-bromophenyl)methylene(cyclopentadienyl)(2,7-diphenyl-3,6-di-tert-butylfluorenyl) zirconium dichloride, di(p-bromophenyl)methylene (cyclopentadienyl)(2,7-dimethyl-3,6-di-tert-butylfluorenyl) zirconium dichloride, di(p-bromophenyl)methylene (cyclopentadienyl)(2,7-(trimethylphenyl)-3,6-di-tert-butylfluorenyl)zirconium dichloride, di(p-bromophenyl) methylene(cyclopentadienyl)(2,7-(dimethylphenyl)-3,6-di-tert-butylfluorenyl)zirconium dichloride, di(p-bromophenyl) methylene(cyclopentadienyl)(2,3,6,7-tetra-tert-butylfluorenyl)zirconium dichloride, di(m-trifluoromethyl-phenyl)methylene(cyclopentadienyl)(2,7-di-tert-butylfluorenyl)zirconium dichloride, di(m-trifluoromethyl-phenyl)methylene(cyclopentadienyl)(3,6-di-tert-butylfluorenyl)zirconium dichloride, di(m-trifluoromethyl-phenyl)methylene(cyclopentadienyl)-(octamethyloctahydrodibenzofluorenyl)zirconium dichloride, di(m-trifluoromethyl-phenyl)methylene(cyclopentadienyl)-(octamethyltetrahydrodicyclopentafluorenyl) zirconium dichloride, di(m-trifluoromethyl-phenyl)methylene(cyclopentadienyl)-(dibenzofluorenyl)zirconium dichloride, di(m-trifluoromethyl-phenyl)methylene(cyclopentadienyl)(1,1',3,6,8,8'-hexamethyl-2,7-dihydrodicyclopentafluorenyl)zirconium dichloride, di(m-trifluoromethyl-phenyl)methylene(cyclopentadienyl)(1,3,3',6,6',8-hexamethyl-2,7-dihydrodicyclopentafluorenyl)zirconium dichloride, di(m-trifluoromethyl-phenyl)methylene(cyclopentadienyl)(2,7-diphenyl-3,6-di-tert-butylfluorenyl)zirconium dichloride, di(m-trifluoromethyl-phenyl)methylene (cyclopentadienyl)(2,7-dimethyl-3,6-di-tert-butylfluorenyl) zirconium dichloride, di(m-trifluoromethyl-phenyl) methylene(cyclopentadienyl)(2,7-(trimethylphenyl)-3,6-di-tert-butylfluorenyl)zirconium dichloride, di(m-trifluoromethyl-phenyl)methylene(cyclopentadienyl)(2,7-(dimethylphenyl)-3,6-di-tert-butylfluorenyl) zirconium dichloride, di(m-trifluoromethyl-phenyl)methylene(cyclopentadienyl)(2,3,6,7-tetra-tert-butylfluorenyl)zirconium dichloride, di(p-trifluoromethyl-phenyl)methylene(cyclopentadienyl)(2,7-di-tert-butylfluorenyl)zirconium dichloride, di(p-trifluoromethyl-phenyl)methylene(cyclopentadienyl)(3,6-di-tert-butylfluorenyl)zirconium dichloride, di(p-trifluoromethyl-phenyl)methylene(cyclopentadienyl)-(octamethyloctahydrodibenzofluorenyl)zirconium dichloride, di(p-trifluoromethyl-phenyl)methylene(cyclopentadienyl)-(octamethyltetrahydrodicyclopentafluorenyl) zirconium dichloride, di(p-trifluoromethyl-phenyl)methylene(cyclopentadienyl)-(dibenzofluorenyl)zirconium dichloride, di(p-trifluoromethyl-phenyl)methylene(cyclopentadienyl)(1,1',3,6,8,8'-hexamethyl-2,7-dihydrodicyclopentafluorenyl)zirconium dichloride, di(p-trifluoromethyl-phenyl)methylene(cyclopentadienyl)(1,3,3',6,6',8-hexamethyl-2,7-dihydrodicyclopentafluorenyl)zirconium dichloride, di(p-trifluoromethyl-phenyl)methylene(cyclopentadienyl)(2,7-diphenyl-3,6-di-tert-butylfluorenyl)zirconium dichloride, di(p-trifluoromethyl-phenyl)methylene(cyclopentadienyl)(2,7-dimethyl-3,6-di-tert-butylfluorenyl) zirconium dichloride, di(p-trifluoromethyl-phenyl)methylene (cyclopentadienyl) (2,7-(trimethylphenyl)-3,6-di-tert-butylfluorenyl) zirconium dichloride, di(p-trifluoromethyl-phenyl)methylene(cyclopentadienyl)(2,7-(dimethylphenyl)-3,6-di-tert-butylfluorenyl)zirconium dichloride, di(p-trifluoromethyl-phenyl)methylene(cyclopentadienyl)(2,3,6,7-tetra-tert-butylfluorenyl)zirconium dichloride, di(p-tert-butyl-phenyl)methylene(cyclopentadienyl)(2,7-di-tert-butylfluorenyl)zirconium dichloride, di(p-tert-butyl-phenyl)methylene(cyclopentadienyl)(3,6-di-tert-butylfluorenyl) zirconium dichloride, di(p-tert-butyl-phenyl)methylene (cyclopentadienyl)-(octamethyloctahydrodibenzofluorenyl) zirconium dichloride, di(p-tert-butyl-phenyl)methylene (cyclopentadienyl)-(octamethyltetrahydrocyclopentafluorenyl)zirconium dichloride, di(p-tert-butyl-phenyl)methylene(cyclopentadienyl)-(dibenzofluorenyl)zirconium dichloride, di(p-tert-butyl-phenyl)methylene(cyclopentadienyl)(1,1',3,6,8,8'-hexamethyl-2,7-dihydrodicyclopentafluorenyl)zirconium dichloride, di(p-tert-butyl-phenyl)methylene(cyclopentadienyl)(1,3,3',6,6',8-hexamethyl-2,7-dihydrodicyclopentafluorenyl)zirconium dichloride, di(p-tert-butyl-phenyl)methylene(cyclopentadienyl)(2,7-diphenyl-3,6-di-tert-butylfluorenyl)zirconium dichloride, di(p-tert-butyl-phenyl)methylene(cyclopentadienyl(2,7-dimethyl-3,6-di-tert-butylfluorenyl)zirconium dichloride, di(p-tert-butyl-phenyl)methylene(cyclopentadienyl)(2,7-(trimethylphenyl)-3,6-di-tert-butylfluorenyl)zirconium dichloride, di(p-tert-butyl-phenyl)methylene(cyclopentadienyl)(2,7-(dimethylphenyl)-3,6-di-tert-butylfluorenyl)zirconium dichloride, di(p-tert-butyl-phenyl)methylene(cyclopentadienyl)(2,3,6,7-tetra-tert-butylfluorenyl)zirconium dichloride, di(p-n-butyl-phenyl)methylene(cyclopentadienyl)(2,7-di-tert-butylfluorenyl)zirconium dichloride, di(p-n-butyl-phenyl)methylene(cyclopentadienyl)(3,6-di-tert-butylfluorenyl) zirconium dichloride, di(p-n-butyl-phenyl)methylene (cyclopentadienyl)-(octamethyloctahydrodibenzofluorenyl) zirconium dichloride, di(p-n-butyl-phenyl)methylene (cyclopentadienyl)-(octamethyltetrahydrocyclopentafluorenyl)zirconium dichloride, di(p-n-butyl-phenyl)-methylene(cyclopentadienyl)-(dibenzofluorenyl)zirconium dichloride, di(p-n-butyl-phenyl)methylene(cyclopentadienyl)(1,1',3,6,8,8'-hexamethyl-2,7-dihydrodicyclopentafluorenyl)zirconium dichloride, di(p-n-butyl-phenyl)methylene(cyclopentadienyl)(1,3,3',6,6',8-hexamethyl-2,7-dihydrodicyclopentafluorenyl)zirconium dichloride, di(p-n-butyl-phenyl)methylene(cyclopentadienyl)(2,7-diphenyl-3,6-di-tert-butylfluorenyl)zirconium dichloride, di(p-n-butyl-phenyl) methylene (cyclopentadienyl) (2,7-dimethyl-3,6-di-tert-butylfluorenyl)zirconium dichloride, di(p-n-butyl-phenyl)methylene(cyclopentadienyl)(2,7-(trimethylphenyl)-3,6-di-tert-butylfluorenyl)zirconium dichloride, di(p-n-butyl-phenyl)methylene(cyclopentadienyl)(2,7-(dimethylphenyl)-3,6-di-tert-butylfluorenyl) zirconium dichloride, di(p-n-butyl-phenyl)methylene(cyclopentadienyl)(2,3,6,7-tetra-tert-butylfluorenyl)zirconium dichloride, di(p-biphenyl) methylene(cyclopentadienyl)(2,7-di-tert-butylfluorenyl) zirconium dichloride, di(p-biphenyl)methylene (cyclopentadienyl)(3,6-di-tert-butylfluorenyl)zirconium dichloride, di(p-biphenyl)methylene(cyclopentadienyl)-(octamethyloctahydrodibenzofluorenyl)zirconium dichloride, di(p-biphenyl)methylene(cyclopentadienyl)-(octamethyltetrahydrocyclopentafluorenyl)zirconium dichloride, di(p-biphenyl)methylene(cyclopentadienyl)-(dibenzofluorenyl)zirconium dichloride, di(p-biphenyl)methylene (cyclopentadienyl)(1,1',3,6,8,8'-hexamethyl-2,7-dihydrodicyclopentafluorenyl)zirconium dichloride, di(p-biphenyl)methylene(cyclopentadienyl)(1,3,3',6,6',8-hexamethyl-2,7-dihydrodicyclopentafluorenyl)zirconium dichloride, di(p-biphenyl)methylene(cyclopentadienyl)(2,7-diphenyl-3,6-di-tert-butylfluorenyl)zirconium dichloride, di(p-biphenyl)methylene(cyclopentadienyl)(2,7-dimethyl-3,6-di-tert-butylfluorenyl)zirconium dichloride, di(p-biphenyl) methylene(cyclopentadienyl)(2,7-(trimethylphenyl)-3,6-di-tert-butylfluorenyl)zirconium dichloride, di(p-biphenyl) methylene(cyclopentadienyl)(2,7-(dimethylphenyl)-3,6-di-tert-butylfluorenyl)zirconium dichloride, di(p-biphenyl) methylene(cyclopentadienyl)(2,3,6,7-tetra-tert-butylfluorenyl)zirconium dichloride, di(1-naphthyl) methylene(cyclopentadienyl)(2,7-di-tert-butylfluorenyl) zirconium dichloride, di(1-naphthyl)methylene (cyclopentadienyl)(3,6-di-tert-butylfluorenyl)zirconium dichloride, di(1-naphthyl)methylene(cyclopentadienyl)-(octamethyloctahydrodibenzofluorenyl)zirconium dichloride, di(1-naphthyl)methylene(cyclopentadienyl)-(octamethyltetrahydrocyclopentafluorenyl)zirconium dichloride, di(1-naphthyl)methylene(cyclopentadienyl)-(dibenzofluorenyl) zirconium dichloride, di(1-naphthyl)methylene (cyclopentadienyl)(1,1',3,6,8,8'-hexamethyl-2,7-dihydrodicyclopentafluorenyl)zirconium dichloride, di(1-naphthyl)methylene(cyclopentadienyl)(1,3,3',6,6',8-hexamethyl-2,7-dihydrodicyclopentafluorenyl)zirconium dichloride, di(1-naphthyl)methylene(cyclopentadienyl)(2,7-diphenyl-3,6-di-tert-butylfluorenyl)zirconium dichloride, di(1-naphthyl)methylene(cyclopentadienyl)(2,7-dimethyl-3,6-di-tert-butylfluorenyl)zirconium dichloride, di(1-naphthyl) methylene(cyclopentadienyl)(2,7-(trimethylphenyl)-3,6-di-tert-butylfluorenyl)zirconium dichloride, di(1-naphthyl) methylene(cyclopentadienyl)(2,7-(dimethylphenyl)-3,6-di-tert-butylfluorenyl)zirconium dichloride, di(1-naphthyl) methylene(cyclopentadienyl)(2,3,6,7-tetra-tert-butylfluorenyl)zirconium dichloride, di(2-naphthyl) methylene(cyclopentadienyl)(2,7-di-tert-butylfluorenyl) zirconium dichloride, di(2-naphthyl)methylene (cyclopentadienyl)(3,6-di-tert-butylfluorenyl)zirconium dichloride, di(2-naphthyl)methylene(cyclopentadienyl)-(octamethyloctahydrodibenzofluorenyl)zirconium dichloride, di(2-naphthyl)methylene(cyclopentadienyl)-(octamethyltetrahydrocyclopentafluorenyl)zirconium dichloride, di(2-naphthyl)methylene(cyclopentadienyl)-(dibenzofluorenyl) zirconium dichloride, di(2-naphthyl)methylene (cyclopentadienyl)(1,1',3,6,8,8'-hexamethyl-2,7-dihydrodicyclopentafluorenyl)zirconium dichloride, di(2-naphthyl)methylene(cyclopentadienyl)(1,3,3',6,6',8-hexamethyl-2,7-dihydrodicyclopentafluorenyl)zirconium dichloride, di(2-naphthyl)methylene(cyclopentadienyl)(2,7-diphenyl-3,6-di-tert-butylfluorenyl)zirconium dichloride, di(2-naphthyl)methylene(cyclopentadienyl)(2,7-dimethyl-3,6-di-tert-butylfluorenyl)zirconium dichloride, di(2-naphthyl) methylene(cyclopentadienyl)(2,7-(trimethylphenyl)-3,6-di-tert-butylfluorenyl)zirconium dichloride, di(2-naphthyl) methylene(cyclopentadienyl)(2,7-(dimethylphenyl)-3,6-di-tert-butylfluorenyl)zirconium dichloride, di(2-naphthyl) methylene(cyclopentadienyl)(2,3,6,7-tetra-tert-butylfluorenyl)zirconium dichloride, di(naphthylmethyl) methylene (cyclopentadienyl) (2,7-di-tert-butylfluorenyl) zirconium dichloride, di(naphthylmethyl)methylene (cyclopentadienyl)(3,6-di-tert-butylfluorenyl)zirconium dichloride, di(naphthylmethyl)methylene(cyclopentadienyl)-(octamethyloctahydrodibenzofluorenyl)zirconium dichloride, di(naphthylmethyl)methylene(cyclopentadienyl)-(benzofluorenyl)zirconium dichloride, di(naphthylmethyl)methylene(cyclopentadienyl)-(dibenzofluorenyl)zirconium dichloride, di(naphthylmethyl)methylene (cyclopentadienyl)-(octahydrodibenzofluorenyl)zirconium dichloride, di(naphthylmethyl)methylene(cyclopentadienyl)-(octamethyltetrahydrodicyclopentafluorenyl)zirconium dichloride, di(m-tolyl)methylene(cyclopentadienyl)(2,7-di-tert-butylfluorenyl)zirconium dichloride, di(m-tolyl)methylene(cyclopentadienyl)(2,7-dimethylfluorenyl) zirconium dichloride, di(m-tolyl)methylene (cyclopentadienyl)(3,6-di-tert-butylfluorenyl)zirconium dichloride, di(p-isopropylphenyl)methylene(cyclopentadienyl)-octamethyloctahydrodibenzofluorenyl)zirconium dichloride, di(p-isopropylphenyl)methylene(cyclopentadienyl)-(opctamethyloctahydrodibenzofluorenyl)zirconium dichloride, di(p-isopropylphenyl)methylene(cyclopentadienyl)(2,7-di-tert-butylfluorenyl)zirconium dichloride, di(p-isopropylphenyl)methylene(cyclopentadienyl)(3,6-di-tert-butylfluorenyl)zirconium dichloride, diphenetylmethylene (cyclopentadienyl)(2,7-di-tert-butylfluorenyl)zirconium dichloride, diphenetylmethylene(cyclopentadienyl)(3,6-di-tert-butylfluorenyl)zirconium dichloride, diphenetylmethylene(cyclopentadienyl)-(octamethyloctahydrodibenzofluorenyl)zirconium dichloride, diphenetylmethylene (cyclopentadienyl)-(benzofluorenyl)zirconium dichloride, diphenetylmethylene(cyclopentadienyl)-(dibenzofluorenyl) zirconium dichloride, diphenetylmethylene(cyclopentadienyl)-(octahydrodibenzofluorenyl)zirconium dichloride, diphenetylmethylene(cyclopentadienyl)-(octamethyltetrahydrodicyclopentafluorenyl)zirconium dichloride, di(benzhydryl)methylene(cyclopentadienyl)(2,7-di-tert-butylfluorenyl)zirconium dichloride, di(benzhydryl)methylene (cyclopentadienyl)(3,6-di-tert-butylfluorenyl)zirconium dichloride, di(benzhydryl)methylene(cyclopentadienyl)-(octamethyloctahydrodibenzofluorenyl)zirconium dichloride, di(benzhydryl)methylene(cyclopentadienyl)-(benzofluorenyl)zirconium dichloride, di(benzhydryl)methylene(cyclopentadienyl)-(dibenzofluorenyl)zirconium dichloride, di(benzhydryl)methylene(cyclopentadienyl)-(octahydrodibenzofluorenyl)zirconium dichloride, di(benzhydryl)methylene(cyclopentadienyl)-(octamethyltetrahydrodicyclopentafluorenyl)zirconium dichloride, di(cumyl)methylene (cyclopentadienyl)(fluorenyl)zirconium dichloride, di(cumyl)methylene(cyclopentadienyl)(2,7-di-tert-butylfluorenyl)zirconium dichloride, di(cumyl)methylene(cyclopentadienyl)(3,6-di-tert-butylfluorenyl)zirconium dichloride, di(cumyl)methylene(cyclopentadienyl)-(octamethyloctahydrodibenzofluorenyl)zirconium dichloride, di(cumyl)methylene(cyclopentadienyl)-(benzofluorenyl)zirconium dichloride, di(cumyl)methylene(cyclopentadienyl)-(dibenzofluorenyl)zirconium dichloride, di(cumyl)methylene(cyclopentadienyl)-(octahydrodibenzofluorenyl)zirconium dichloride, di(cumyl)methylene(cyclopentadienyl)-(octamethyltetrahydrodicyclopentafluorenyl)zirconium dichloride, di(1-phenyl-ethyl) methylene(cyclopentadienyl)(2,7-di-tert-butylfluorenyl) zirconium dichloride, di(1-phenyl-ethyl)methylene (cyclopentadienyl)(3,6-di-tert-butylfluorenyl)zirconium dichloride, di(1-phenyl-ethyl)methylene(cyclopentadienyl)-(octamethyloctahydrodibenzofluorenyl)zirconium dichloride, di(1-phenyl-ethyl)methylene (cyclopentadienyl)-(benzofluorenyl)zirconium dichloride, di(1-phenyl-ethyl) methylene(cyclopentadienyl)-(dibenzofluorenyl)zirconium dichloride, di(1-phenyl-ethyl)methylene(cyclopentadienyl)-(octahydrodibenzofluorenyl)zirconium dichloride, di(1-phenyl-ethyl)methylene(cyclopentadienyl)-(octamethyltetrahydrodicyclopentafluorenyl)zirconium dichloride, di(biphenylmethyl)methylene(cyclopentadienyl)-(fluorenyl) zirconium dichloride, di(biphenylmethyl)methylene(cyclopentadienyl)(2,7-di-tert-butylfluorenyl)zirconium dichloride, di(biphenylmethyl)methylene(cyclopentadienyl)(3,6-di-tert-butylfluorenyl)zirconium dichloride, di(biphenylmethyl)methylene(cyclopentadienyl)-(octamethyloctahydrodibenzofluorenyl)zirconium dichloride, di(biphenylmethyl)methylene(cyclopentadienyl)-(benzofluorenyl)zirconium dichloride, di(biphenylmethyl)methylene (cyclopentadienyl)-(dibenzofluorenyl)zirconium dichloride, di(biphenylmethyl)methylene(cyclopentadienyl)-(octahydrodibenzofluorenyl)zirconium dichloride, di(biphenylmethyl)methylene(cyclopentadienyl)-(octamethyltetrahydrodicyclopentafluorenyl)zirconium dichloride, di(p-tolyl) methylene(cyclopentadienyl)(2,3,6,7-tetramethylfluorenyl) zirconium dichloride, diphenylsilylene(cyclopentadienyl)(2,7-di-tert-butylfluorenyl)zirconium dichloride, diphenylsilylene(cyclopentadienyl)(3,6-di-tert-butylfluorenyl)zirconium dichloride, diphenylsilylene(cyclopentadienyl)-(octamethyloctahydrodibenzofluorenyl)zirconium dichloride, diphenylsilylene(cyclopentadienyl)-(octamethyltetrahydrodicyclopentafluorenyl)zirconium dichloride, diphenylsilylene(cyclopentadienyl)-(dibenzofluorenyl)zirconium dichloride, diphenylsilylene(cyclopentadienyl) (1,1',3,6,8,8'-hexamethyl-2,7-dihydrodicyclopentafluorenyl)zirconium dichloride, diphenylsilylene(cyclopentadienyl)-(1,3,3',6,6',8-hexamethyl-2,7-dihydrodicyclopentafluorenyl)zirconium dichloride, diphenylsilylene(cyclopentadienyl)(2,7-diphenyl-3,6-di-tert-butylfluorenyl)zirconium dichloride, diphenylsilylene(cyclopentadienyl)(2,7-dimethyl-3,6-di-tert-butylfluorenyl)zirconium dichloride, diphenylsilylene (cyclopentadienyl)(2,7-(trimethylphenyl)-3,6-di-tert-butylfluorenyl)zirconium dichloride, diphenylsilylene (cyclopentadienyl)(2,7-(dimethylphenyl)-3,6-di-tert-butylfluorenyl)zirconium dichloride, diphenylsilylene (cyclopentadienyl)(2,3,6,7-tetra-tert-butylfluorenyl) zirconium dichloride, di(p-tolyl)methylene(methyl-tert-butylcyclopentadienyl)(2,7-di-tert-butylfluorenyl)zirconium dichloride, di(p-tolyl)methylene(methyl-tert-butylcyclopentadienyl)(3,6-di-tert-butylfluorenyl)zirconium dichloride, di(p-tolyl)methylene(methyl-tert-butylcyclopentadienyl)-(octamethyloctahydrodibenzofluorenyl)zirconium dichloride, di(p-tolyl)methylene(methyl-tert-butylcyclopentadienyl)-(octamethyltetrahydrodicyclopentafluorenyl) zirconium dichloride, di(p-tolyl)methylene(methyl-tert-butylcyclopentadienyl)(dibenzofluorenyl)zirconium dichloride, di(p-tolyl)methylene(methyl-tert-butylcyclopentadienyl)(1,1',3,6,8,8'-hexamethyl-2,7-dihydrodicyclopentafluorenyl)zirconium dichloride, di(p-tolyl)methylene(methyl-tert-butylcyclopentadienyl)(1,3,3',6,6',8-hexamethyl-2,7-dihydrodicyclopentafluorenyl)zirconium dichloride, di(p-tolyl)methylene(methyl-tert-butylcyclopentadienyl)(2,7-diphenyl-3,6-di-tert-butylfluorenyl)zirconium dichloride, di(p-tolyl)methylene(methyl-tert-butylcyclopentadienyl)(2,7-dimethyl-3,6-di-tert-butylfluorenyl)zirconium dichloride, di(p-tolyl)methylene(methyl-tert-butylcyclopentadienyl)(2,7-(trimethylphenyl)-3,6-di-tert-butylfluorenyl)zirconium dichloride, di(p-tolyl)methylene(methyl-tert-butylcyclopentadienyl)(2,7-(dimethylphenyl)-3,6-di-tert-butylfluorenyl) zirconium dichloride, di(p-tolyl)methylene(methyl-tert-butylcyclopentadienyl)(2,3,6,7-tetra-tert-butylfluorenyl) zirconium dichloride, di(p-tolyl)methylene (methylcyclopentadienyl)(2,7-di-tert-butylfluorenyl) zirconium dichloride, di(p-tolyl)methylene (methylcyclopentadienyl)(3,6-di-tert-butylfluorenyl) zirconium dichloride, di(p-tolyl)methylene (methylcyclopentadienyl)-

(octamethyloctahydrodibenzofluorenyl)zirconium dichloride, di(p-tolyl)methylene(methylcyclopentadienyl)-(octamethyltetrahydrodicyclopentafluorenyl)zirconium dichloride, di(p-tolyl)methylene(methylcyclopentadienyl)(dibenzofluorenyl) zirconium dichloride, di(p-tolyl)methylene(methylcyclopentadienyl)(1,1',3,6,8,8'-hexamethyl-2,7-dihydrodicyclopentafluorenyl)zirconium dichloride, di(p-tolyl)methylene(methylcyclopentadienyl)(1,3,3',6,6',8-hexamethyl-2,7-dihydrodicyclopentafluorenyl)zirconium dichloride, di(p-tolyl)methylene(methylcyclopentadienyl)(2,7-diphenyl-3,6-di-tert-butylfluorenyl)zirconium dichloride, di(p-tolyl)methylene(methylcyclopentadienyl)(2,7-dimethyl-3,6-di-tert-butylfluorenyl)zirconium dichloride, di(p-tolyl)methylene(methylcyclopentadienyl)(2,7-(trimethylphenyl)-3,6-di-tert-butylfluorenyl)zirconium dichloride, di(p-tolyl)methylene(methylcyclopentadienyl)(2,7-(dimethylphenyl)-3,6-di-tert-butylfluorenyl)zirconium dichloride, di(p-tolyl)methylene(methylcyclopentadienyl)(2,3,6,7-tetra-tert-butylfluorenyl)zirconium dichloride, di(p-tolyl)methylene(tetramethylcyclopentadienyl)(2,7-di-tert-butylfluorenyl)zirconium dichloride, di(p-tolyl)methylene(tetramethylcyclopentadienyl)(3,6-di-tert-butylfluorenyl)zirconium dichloride, di(p-tolyl)methylene(tetramethylcyclopentadienyl)-(octamethyloctahydrodibenzofluorenyl)zirconium dichloride, di(p-tolyl)methylene(tetramethylcyclopentadienyl)-(octamethyltetrahydrodicyclopentafluorenyl)zirconium dichloride, di(p-tolyl)methylene(tetramethylcyclopentadienyl)-(dibenzofluorenyl)zirconium dichloride, di(p-tolyl)methylene(tetramethylcyclopentadienyl)-(1,1',3,6,8,8'-hexamethyl-2,7-dihydrodicyclopentafluorenyl)zirconium dichloride, di(p-tolyl)methylene(tetramethylcyclopentadienyl)(1,3,3',6,6', 8-hexamethyl-2,7-dihydrodicyclopentafluorenyl)zirconium dichloride, di(p-tolyl)methylene(tetramethylcyclopentadienyl)(2,7-diphenyl-3,6-di-tert-butylfluorenyl)zirconium dichloride, di(p-tolyl)methylene(tetramethylcyclopentadienyl)(2,7-dimethyl-3,6-di-tert-butylfluorenyl)zirconium dichloride, di(p-tolyl)methylene(tetramethylcyclopentadienyl)(2,7-(trimethylphenyl)-3,6-di-tert-butylfluorenyl)zirconium dichloride, di(p-tolyl)methylene(tetramethylcyclopentadienyl)(2,7-(dimethylphenyl)-3,6-di-tert-butylfluorenyl)zirconium dichloride, and di(p-tolyl)methylene(tetramethylcyclopentadienyl)(2,3,6,7-tetra-tert-butylfluorenyl)zirconium dichloride.

Further, titanium compounds and hafnium compounds having similar stereostructure, bromides, iodides, and such transition metal compounds as described in Japanese Patent Laid-Open Publication No. 9913/1991, Japanese Patent Laid-Open Publication No. 131488/1990, Japanese Patent Laid-Open Publication No. 21607/1991, Japanese Patent Laid-Open Publication No. 106907/1991, Japanese Patent Laid-Open Publication No. 188092/1991, Japanese Patent Laid-Open Publication No. 69394/1992, Japanese Patent Laid-Open Publication No. 300887/1992 and WO 01/27124A1 can be also exemplified.

The octamethyloctahydrodibenzofluorene indicates a compound of a structure represented by the formula [7], the octamethyltetrahydrodicyclopentafluorene indicates a compound of a structure represented by the formula [8], the dibenzofluorene indicates a compound of a structure represented by the formula [9], the 1,1',3,6,8,8'-hexamethyl-2,7-dihydrodicyclopentafluorenyl indicates a compound of a structure represented by the formula [10], and the 1,3,3',6,6',8-hexamethyl-2,7-dihydrodicyclopentafluorenyl indicates a compound of a structure represented by the formula [11].

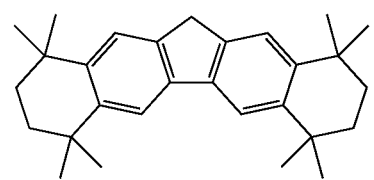

[7]

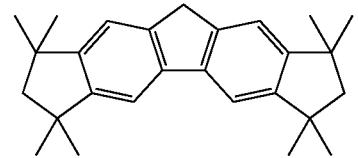

[8]

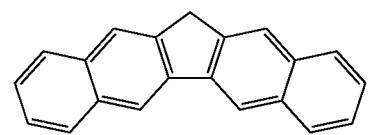

[9]

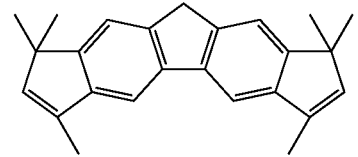

[10]

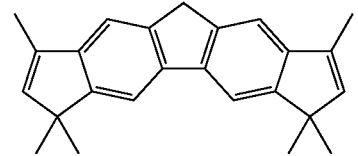

[11]

The transition metal compound (A) used in the working examples is a compound of the following formula [12], [13], [14], [15], [16], [17], [18] or [19], but in the present invention, the transition metal compound (A) is not limited thereto.

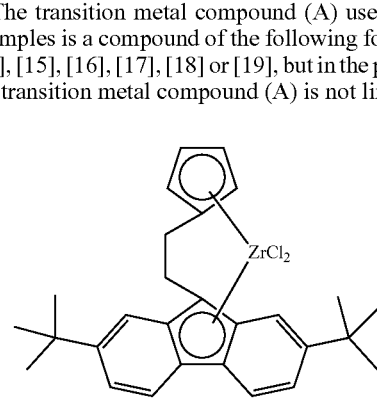

[12]

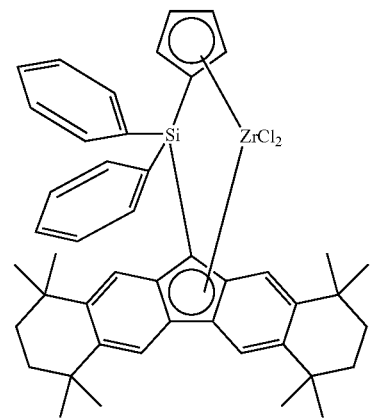

[13]

-continued

[14]
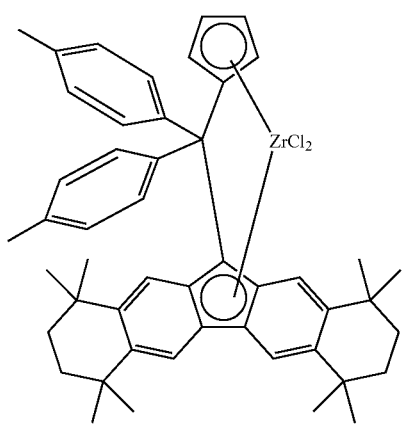

[15]
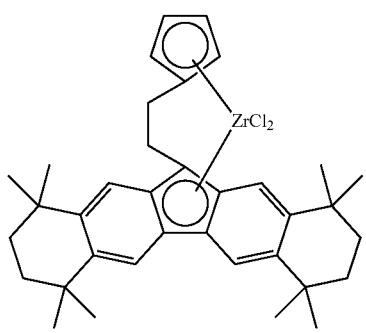

[16]
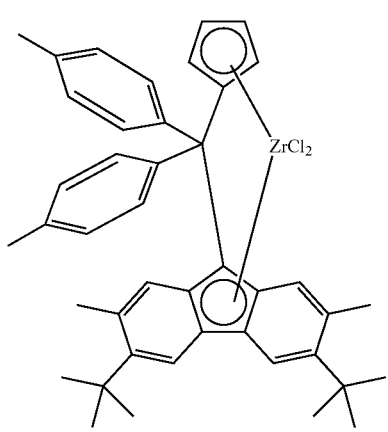

[17]
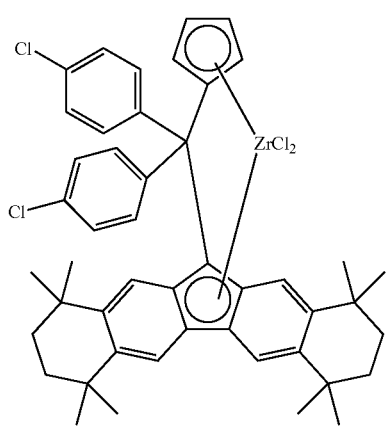

-continued

[18]
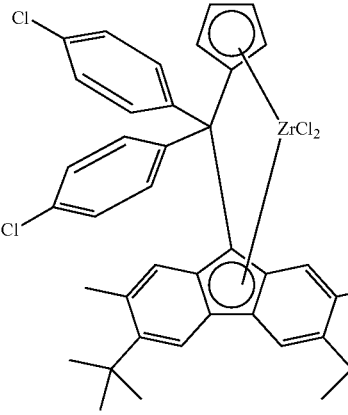

[19]
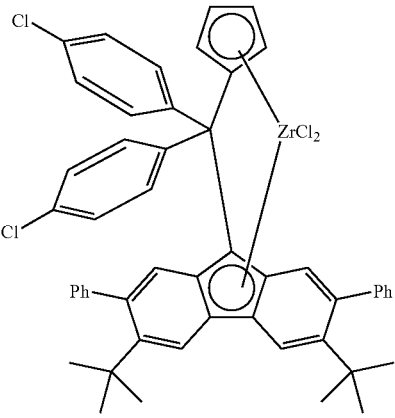

The structure of the transition metal compound obtained is determined by 270 MHz $^1$H-NMR (JEOL Ltd. GSH-270) and FD-mass spectrometry (JEOL Ltd. SX-102A).

When the bridged metallocene compound is used as the olefin polymerization catalyst in the present invention, the catalyst components consist of (A) the bridged metallocene compound represented by the formula [1], [2], [3], [4] or [5] and (B) at least one compound selected from (B-1) an organometallic compound, (B-2) an organoaluminum compound, (B-3) an organoaluminum oxy-compound and (B-4) a compound which reacts with the Group 4 transition metal compound (A) to form an ion pair.

The component (B) is described in detail hereinafter.

(B-1) Organometallic Compound

The organometallic compound (B-1) for use in the present invention is specifically such an organometallic compound as described below.

A dialkyl compound of a periodic table Group 2 or Group 12 metal, which is represented by the following formula:

$$R^a R^b M^3 \quad [20]$$

wherein $R^a$ and $R^b$ may be the same as or different from each other and are each a hydrocarbon group of 1 to 15 carbon atoms, preferably 1 to 4 carbon atoms, and $M^3$ is Mg, Zn or Cd.

Such organometallic compounds (B-1) may be used singly or in combination of two or more kinds.

(B-2) Organoaluminum Compound

The organoaluminum compound (B-2) for forming the olefin polymerization catalyst is, for example, an organoaluminum compound represented by the following formula [21], an alkyl complex compound of a Group 1 metal and aluminum, which is represented by the following formula [22], or an organoaluminum oxy-compound.

An organoaluminum compound represented by the formula [21]:

$$R^a{}_m Al(OR^b)_n H_p X_q \quad [21]$$

wherein $R^a$ and $R^b$ may be the same as or different from each other and are each a hydrocarbon group of 1 to 15 carbon atoms, preferably 1 to 4 carbon atoms, X is a halogen atom, and m, n, p and q are numbers satisfying the conditions of $0<m\leq3$, $0\leq n<3$, $0\leq p<3$, $0\leq q<3$ and $m+n+p+q=3$.

Examples of such compounds include trimethylaluminum, triethylaluminum, triisobutylaluminum and diisobutylaluminum hydride.

An alkyl complex compound of a periodic table Group 1 metal and aluminum, which is represented by the formula [22]:

$$M^2 Al R^a{}_4 \quad [22]$$

wherein $M^2$ is Li, Na or K, and $R^a$ is a hydrocarbon group of 1 to 15 carbon atoms, preferably 1 to 4 carbon atoms.

Examples of such compounds include $LiAl(C_2H_5)_4$ and $LiAl(C_7H_{15})_4$.

The organoaluminum compound represented by the formula [21] is, for example, a compound represented by the following formula [23], [24], [25] or [26].

$$R^a{}_m Al(OR^b)_{3-m} \quad [23]$$

wherein $R^a$ and $R^b$ may be the same as or different from each other and are each a hydrocarbon group of 1 to 15 carbon atoms, preferably 1 to 4 carbon atoms, and m is preferably a number of $1.5 \leq m \leq 3$.

$$R^a{}_m Al X_{3-m} \quad [24]$$

wherein $R^a$ is a hydrocarbon group of 1 to 15 carbon atoms, preferably 1 to 4 carbon atoms, X is a halogen atom, and m is preferably a number of $0<m<3$.

$$R^a{}_m Al H_{3-m} \quad [25]$$

wherein $R^a$ is a hydrocarbon group of 1 to 15 carbon atoms, preferably 1 to 4 carbon atoms, and m is preferably a number of $2 \leq m < 3$.

$$R^a{}_m Al(OR^b)_n X_q \quad [26]$$

wherein $R^a$ and $R^b$ may be the same as or different from each other and are each a hydrocarbon group of 1 to 15 carbon atoms, preferably 1 to 4 carbon atoms, X is a halogen atom, and m, n and q are numbers satisfying the conditions of $0<m\leq3$, $0\leq n<3$, $0\leq q<3$ and $m+n+q=3$.

Examples of the aluminum compounds represented by the formulas [23], [24], [25] and [26] include tri-n-alkylaluminums, such as trimethylaluminum, triethylaluminum, tri-n-butylaluminum, tripropylaluminum, tripentylaluminum, trihexylaluminum, trioctylaluminum and tridecylaluminum; branched chain trialkylaluminums, such as triisopropylaluminum, triisobutylaluminum, tri-sec-butylaluminum, tri-tert-butylaluminum, tri-2-methylbutylaluminum, tri-3-methylbutylaluminum, tri-2-methylpentylaluminum, tri-3-methylpentylaluminum, tri-4-methylpentylaluminum, tri-2-methylhexylaluminum, tri-3-methylhexylaluminum and tri-2-ethylhexylaluminum; tricycloalkylaluminums, such as tricyclohexylaluminum and tricyclooctylaluminum; triarylaluminums, such as triphenylaluminum and tritolylaluminum; dialkylaluminum hydrides, such as diisopropylaluminum hydride and diisobutylaluminum hydride; alkenylaluminums represented by the formula $(i-C_4H_9)_x Al_y (C_5H_{10})_z$ (x, y and z are each a positive number, and $z \leq 2x$), such as isoprenylaluminum; alkylaluminum alkoxides, such as isobutylaluminum methoxide, isobutylaluminum ethoxide and isobutylaluminum isopropoxide; dialkylaluminum alkoxides, such as dimethylaluminum methoxide, diethylaluminum ethoxide and dibutylaluminum butoxide; alkylaluminum sesquialkoxides, such as ethylaluminum sesquiethoxide and butylaluminum sesquibutoxide; partially alkoxylated alkylaluminums having average composition represented by the formula $R^a{}_{2.5}Al(OR^b)_{0.5}$; alkylaluminum aryloxides, such as diethylaluminum phenoxide, diethylaluminum(2,6-di-t-butyl-4-methylphenoxide), ethylaluminumbis(2,6-di-t-butyl-4-methylphenoxide), diisobutylaluminum(2,6-di-t-butyl-4-methylphenoxide) and isobutylaluminumbis(2,6-di-t-butyl-4-methylphenoxide); dialkylaluminum halides, such as dimethylaluminum chloride, diethylaluminum chloride, dibutylaluminum chloride, diethylaluminum bromide and diisobutylaluminum chloride; alkylaluminum sesquihalides, such as ethylaluminum sesquichloride, butylaluminum sesquichloride and ethylaluminum sesequibromide; partially halogenated alkylaluminums, such as alkylaluminum dihalides, specifically ethylaluminum dichloride, propylaluminum dichloride and butylaluminum dibromide; dialkylaluminum hydrides, such as diethylaluminum hydride and dibutylaluminum hydride; partially hydrogenated alkylaluminums, such as alkylaluminum dihydrides, specifically ethylaluminum dihydride and propylaluminum dihydride; and partially alkoxylated and halogenated alkylaluminums, such as ethylaluminum ethoxychloride, butylaluminum butoxychloride and ethylaluminum ethoxybromide.

Further, compounds analogous to the compound represented by the formula [21] are also employable, and for example, an organoaluminum compound wherein two or more compounds are bonded through a nitrogen atom is employable. An example of such a compound is $(C_2H_5)_2 AlN(C_2H_5)Al(C_2H_5)_2$.

Examples of the compounds represented by the formula [22] include $LiAl(C_2H_5)_4$ and $LiAl(C_7H_{15})_4$.

Furthermore, compounds by the use of which the above-mentioned organoaluminum compounds are formed in the polymerization system are also employable, and for example, a combination of aluminum halide and alkyllithium or a combination of aluminum halide and alkylmagnesium is also employable.

Of the above compounds, organoaluminum compounds are preferable.

The organoaluminum compounds represented by the formula [21] or the alkyl complex compounds of Group 1 metals and aluminum which are represented by the formula [22] are used singly or in combination of two or more kinds.

(B-3) Organoaluminum Oxy-Compound

As the organoaluminum oxy-compound (B-3), heretofore known aluminoxane can be used as it is in the present invention. Typical examples of such compounds include compounds represented by the following formula [27] and/or the following formula [28].

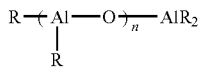

[27]

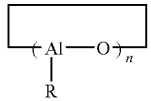

[28]

In the above formulas, R is a hydrocarbon group of 1 to 10 carbon atoms, and n is an integer of 2 or more.

In particular, methylaluminoxane wherein R is a methyl group and n is 3 or more, preferably 10 or more, is employed. The aluminoxanes may contain small amounts of organoaluminum compounds. The characteristic of the high-temperature solution polymerization of the present invention is that such a benzene-insoluble organoaluminum oxy-compound as exemplified in Japanese Patent Laid-Open Publication No. 78687/1990 is also adoptable. Further, an organoaluminum oxy-compound described in Japanese Patent Laid-Open Publication No. 167305/1990 and aluminoxane having two or more kinds of alkyl groups described in Japanese Patent Laid-Open Publication No. 24701/1990 and Japanese Patent Laid-Open Publication No. 103407/1991 can be also favorably employed. The "benzene-insoluble" organoaluminum oxy-compound used in the high-temperature solution polymerization of the present invention means a compound in which the content of an Al component soluble in benzene at 60° C. is usually not more than 10%, preferably not more than 5%, particularly preferably not more than 2%, in terms of an Al atom and which is insoluble or hardly soluble in benzene.

As the organoaluminum oxy-compound, modified methylaluminoxane represented by the following formula [29] is also employable in the present invention.

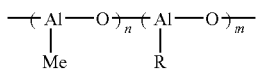

[29]

In the above formula, R is a hydrocarbon group of 1 to 10 carbon atoms, and m and n are each an integer of 2 or greater.

The modified methylaluminoxane is prepared by the use of trimethylaluminum and alkylaluminum other than trimethylaluminum. Such a compound [29] is generally called MMAO. The MMAO can be prepared by processes described in U.S. Pat. No. 4,960,878 and U.S. Pat. No. 5,041,584. A compound which is obtained by the use of trimethylaluminum and triisobutylaluminum and in which R is an isobutyl group is commercially produced by Tosoh Finechem Corporation under the name of MMAO or TMAO. Such MMAO is aluminoxane having been improved in solubility in various solvents and storage stability.

As the organoaluminum oxy-compound, an organoaluminum oxy-compound containing boron and represented by the following formula [30] is also employable in the present invention.

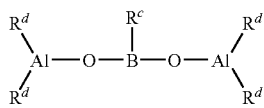

[30]

In the above formula, $R^c$ is a hydrocarbon group of 1 to 10 carbon atoms, and each $R^d$ may be the same or different and is a hydrogen atom, a halogen atom or a hydrocarbon group of 1 to 10 carbon atoms.

The organoaluminum oxy-compound containing boron and represented by the formula [30] can be prepared by reacting an alkylboronic acid represented by the following formula [31] with an organoaluminum compound in an inert solvent at a temperature of −80° C. to room temperature for a period of 1 minute to 24 hours in an inert gas atmosphere.

$$R^c B(OH)_2$$ [31]

In the above formula, $R^c$ is the same group as previously described.

Examples of the alkylboronic acids represented by the formula [31] include methylboronic acid, ethylboronic acid, isopropylboronic acid, n-propylboronic acid, n-butylboronic acid, isobutylboronic acid, n-hexylboronic acid, cyclohexylboronic acid, phenylboronic acid, 3,5-difluorophenylboronic acid, pentafluorophenylboronic acid and 3,5-bis(trifluoromethyl)phenylboronic acid. Of these, preferable are methylboronic acid, n-butylboronic acid, isobutylboronic acid, 3,5-difluorophenylboronic acid and pentafluorophenylboronic acid. These alkylboronic acids are used singly or in combination of two or more kinds.

Examples of the organoaluminum compounds to be reacted with the alkylboronic acid include the same compounds as exemplified for the organoaluminum compounds represented by the formula [21] or [22].

Of the above compounds, preferable are trialkylaluminums and tricycloalkylaluminums, and particularly preferable are trimethylaluminum, triethylaluminum and triisobutylaluminum. These organoaluminum compounds are used singly or in combination of two or more kinds.

(B-4) Compound Which Reacts With the Group 4 Transition Metal Compound (A) to Form Ion Pair Examples of the compounds (B-4) which react with the brigded metallocene compound (A) to form an ion pair (sometimes referred to as "ionic compounds" hereinafter) include Lewis acid, an ionic compound, a borane compound and a carborane compound described in Japanese Patent Laid-Open Publication No. 501950/1989, Japanese Patent Laid-Open Publication No. 502036/1989, Japanese Patent Laid-Open Publication No. 179005/1991, Japanese Patent Laid-Open Publication No. 179006/1991, Japanese Patent Laid-Open Publication No. 207703/1991, Japanese Patent Laid-Open Publication No. 207704/1991 and U.S. Pat. No. 5,321,106. Further, a heteropoly compound and an isopoly compound are also employable.

The ionic compound preferably adopted in the present invention is a compound represented by the following formula [32].

[32]

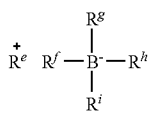

In the above formula, $R^{e+}$ is $H^+$, carbenium cation, oxonium cation, ammonium cation, phosphonium cation, cycloheptyltrienyl cation, ferrocenium cation having a transition metal, or the like. $R^f$ to $R^i$ may be the same as or different from one another and are each an organic group, preferably an aryl group.

Examples of the carbenium cations include tri-substituted carbenium cations, such as triphenylcarbenium cation, tris(methylphenyl)carbenium cation and tris(dimethylphenyl)carbenium cation.

Examples of the ammonium cations include trialkylammonium cations, such as trimethylammonium cation, triethylammonium cation, tri(n-propyl)ammonium cation, triisopropylammonium cation, tri(n-butyl)ammonium cation and triisobutylammonium cation; N,N-dialkylanilinium cations, such as N,N-dimethylanilinium cation, N,N-diethylanilinium cation and N,N-2,4,6-pentamethylanilinium cation; and dialkylammonium cations, such as diisopropylammonium cation and dicyclohexylammonium cation.

Examples of the phosphonium cations include triarylphosphonium cations, such as triphenylphosphonium cation, tris(methylphenyl)phosphonium cation and tris(dimethylphenyl)phosphonium cation.

Of the above cations, preferable as $R^{e+}$ is carbenium cation, ammonium cation or the like, and particularly preferable is triphenylcarbenium cation, N,N-dimethylanilinium cation or N,N-diethylanilinium cation.

Examples of carbenium salts include triphenylcarbenium tetraphenylborate, triphenylcarbenium tetrakis(pentafluorophenyl)borate, triphenylcarbenium tetrakis(3,5-ditrifluoromethylphenyl)borate, tris(4-methylphenyl)carbenium tetrakis(pentafluorophenyl)borate and tris(3,5-dimethylphenyl)carbenium tetrakis(pentafluorophenyl)borate.

Examples of ammonium salts include trialkyl substituted ammonium salts, N,N-dialkylanilinium salts and dialkylammonium salts.

Examples of the trialkyl substituted ammonium salts include triethylammonium tetraphenylborate, tripropylammonium tetraphenylborate, tri(n-butyl)ammonium tetraphenylborate, trimethylammonium tetrakis(p-tolyl)borate, trimethylammonium tetrakis(o-tolyl)borate, tri(n-butyl) ammonium tetrakis(pentafluorophenyl)borate, triethylammonium tetrakis(pentafluorophenyl)borate, tripropylammonium tetrakis(pentafluorophenyl)borate, tripropylammonium tetrakis(2,4-dimethylphenyl)borate, tri(n-butyl) ammonium tetrakis(3,5-dimethylphenyl)borate, tri(n-butyl) ammonium tetrakis(4-trifluoromethylphenyl)borate, tri(n-butyl)ammonium tetrakis(3,5-ditrifluoromethylphenyl) borate, tri(n-butyl)ammonium tetrakis(o-tolyl)borate, dioctadecylmethylammonium tetraphenylborate, dioctadecylmethylammonium tetrakis(p-tolyl) borate, dioctadecylmethylammonium tetrakis(o-tolyl)borate, dioctadecylmethylammonium tetrakis(pentafluorophenyl)borate, dioctadecylmethylammonium tetrakis(2,4-dimethylphenyl) borate, dioctadecylmethylammonium tetrakis(3,5-dimethylphenyl)borate, dioctadecylmethylammonium tetrakis(4-trifluoromethylphenyl)borate, dioctadecylmethylammonium tetrakis(3,5-ditrifluoromethylphenyl)borate, and dioctadecylmethylammonium.

Examples of the N,N-dialkylanilinium salts include N,N-dimethylanilinium tetraphenylborate, N,N-dimethylanilinium tetrakis(pentafluorophenyl)borate, N,N-dimethylanilinium tetrakis(3,5-ditrifluoromethylphenyl)borate, N,N-diethylanilinium tetraphenylborate, N,N-diethylanilinium tetrakis(pentafluorophenyl)borate, N,N-diethylanilinium tetrakis(3,5-ditrifluoromethylphenyl)borate, N,N-2,4,6-pentamethylanilinium tetraphenylborate, and N,N-2,4,6-pentamethylanilinium tetrakis(pentafluorophenyl)borate.

Examples of the dialkylammonium salts include di(1-propyl)ammonium tetrakis(pentafluorophenyl)borate and dicyclohexylammonium tetraphenylborate.

In addition, ionic compounds disclosed by the present applicant (Japanese Patent Laid-Open Publication No. 51676/2004) are also employable without any restriction.

Such ionic compounds (B-4) as mentioned above may be used as a mixture of two or more kinds.

In the working examples, the aforesaid organoaluminum oxy-compound (B-3) was used as the component (B) in the case where the compound of the formula [12] was used as the transition metal compound (A). More specifically, a commercially available MAO/toluene solution manufactured by Nippon Aluminum Alkyls, Ltd. was used. In the case where the compound of the formula [13], [14], [15], [16], [17], [18] or [19] was used as the transition metal compound (A), two of the organoaluminum compound (B-2) and the compound (B-4) which reacts with the Group 4 transition metal compound (A) to form an ion pair were used. More specifically, triisobutylaluminum and N,N-dimethylanilinium tetraphenylborate were used. Of the compounds mentioned above, the compound represented by the formula [5] or [6] is most suitable for producing the α-olefin (co)polymer of the present invention. In this case, it is preferable to use, as the component (B), the organometallic compound (B-1) and/or the organoaluminum compound (B-2) and/or the compound (B-4) which reacts with the Group 4 transition metal compound (A) to form an ion pair. Especially in case of the compound represented by the formula [6] wherein $R^{15}$ and $R^{16}$ are each a phenyl group, the organometallic compound (B-1) and/or the organoaluminum compound (B-2) and/or the compound (B-4) which reacts with the Group 4 transition metal compound (A) to form an ion pair is used as the component (B) that is a constituent of the olefin polymerization catalyst for the present invention in order to prepare the α-olefin (co) polymer of the present invention, and the organoaluminum oxy-compound (B-3) is not used.

In the preparation of the olefin polymerization catalyst for use in the present invention, a carrier can be used when needed. The carrier is usually an inorganic or organic compound and is a granular or fine particulate solid. Examples of the inorganic compounds include porous oxides, inorganic chlorides, clay, clay minerals and ion-exchange layer compounds.

Examples of the porous oxides employable herein include $SiO_2$, $Al_2O_3$, MgO, ZrO, $TiO_2$, $B_2O_3$, CaO, ZnO, BaO, $ThO_2$, and composites or mixtures thereof, such as natural or synthetic zeolite, $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO.

In the present invention, in the presence of such an olefin polymerization catalyst as described above, an α-olefin of 6 to 20 carbon atoms is homopolymerized or olefins are copolymerized to prepare an olefin low-molecular weight polymer.

Examples of the α-olefins of 6 to 20 carbon atoms include 1-hexene, 4-methyl-1-pentene, 3-methyl-1-pentene, 1-octene, 1-nonene, 2-decene, 1-undecene, 1-dodecene, 1-tetradecene, 1-hexadecene, 1-octadecene and 1-eicosene. Preferable are α-olefins of 6 to 16 carbon atoms. In case of copolymerization, α-olefins of 6 to 20 carbon atoms and α-olefins of 2 to 20 carbon atoms are used in combination of arbitrary two or more kinds.

Examples of the α-olefins of 2 to 20 carbon atoms include ethylene, propylene, 1-butene, 1-pentene, 1-hexene, 4-methyl-1-pentene, 3-methyl-1-pentene, 1-octene, 1-nonene, 2-decene, 1-undecene, 1-dodecene, 1-tetradecene, 1-hexadecene, 1-octadecene and 1-eicosene. Of these, particularly preferable are α-olefins of 2 to 16 carbon atoms.

In a preferred embodiment, at least one olefin is 1-octene, 1-decene, 1-dodecene or 1-tetradecene. Homopolymerization of 1-octene, homopolymerization of 1-decene, homopolymerization of 1-dodecene, homopolymerization of 1-tetradecene or copolymerization using any of these olefins as a main monomer is particularly preferable.

An embodiment of a process for preparing an olefin low-molecular weight polymer that is the α-olefin (co)polymer for use in the present invention is described below in detail.

In the present invention, polymerization reaction is carried out in a hydrocarbon solvent. Examples of the hydrocarbon solvents include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethylene chloride, chlorobenzene and dichloromethane; and petroleum fractions, such as gasoline, kerosine and gas oil. Further, olefins used for polymerization are also employable.

In the present invention, polymerization is carried out in the presence of the aforesaid olefin polymerization catalyst, and in the polymerization of an olefin using the olefin polymerization catalyst, the Group 4 transition metal compound (A) is used in an amount of usually $10^{-9}$ to $10^{-1}$ mol, preferably $10^{-8}$ to $10^{-2}$ mol, based on 1 liter of the reaction volume, in terms of a concentration of a transition metal atom in the polymerization reaction system.

The component (B-1) is used in such an amount that the molar ratio ((B-1)/M) of the component (B-1) to the transition metal atom (M) in the component (A) becomes usually 1 to 5,000, preferably 10 to 2,000. The component (B-2) is used in such an amount that the molar ratio ((B-2)/M) of the component (B-2) to the transition metal atom (M) in the component (A) becomes usually 100 to 25,000, preferably 200 to 10,000. The component (B-3) is used in such an amount that the molar ratio ((B-3)/M) of the component (B-3) to the transition metal atom (M) in the component (A) becomes usually 10 to 5,000, preferably 20 to 2,000. The component (B-4) is used in such an amount that the molar ratio ((B-4)/M) of the component (B-4) to the transition metal atom (M) in the component (A) becomes usually 1 to 1,000, preferably 1.5 to 500, more preferably 2 to 200.

The temperature for the polymerization of olefin using the olefin polymerization catalyst is in the range of usually −50 to +200° C., preferably 0 to 180° C. The polymerization pressure is in the range of usually atmospheric pressure to 10 MPa (gauge pressure), preferably atmospheric pressure to 5 MPa (gauge pressure) The polymerization reaction can be carried out by any of a batch process, a semi-continuous process and a continuous process. Further, the polymerization can be carried out in two or more steps which are different in the reaction conditions. The molecular weight of the resulting olefin polymer can be adjusted by allowing hydrogen to exist in the polymerization system or by changing the polymerization temperature.

The lubricating oil composition of the present invention comprises:

(A) the above-mentioned α-olefin (co)polymer in an amount of 15 to 90 parts by weight, (B) a low-viscosity base oil comprising at least one base oil selected from a mineral oil, a synthetic hydrocarbon oil and an ester oil and having a kinematic viscosity at 100° C. of 2 to 10 mm²/s, in an amount of 10 to 85 parts by weight, and optionally, (C) at least one additive selected from the group consisting of a detergent dispersant, a viscosity index improver, an antioxidant, an anti-corrosion agent, an anti-abrasion agent, a friction adjusting agent, a pour point depressant, a rust proof agent, an anti-foaming agent and an extreme pressure agent.

As the low-viscosity base oil for the lubricating oil composition of the present invention, at least one base oil selected from a mineral oil, a synthetic hydrocarbon oil and an ester oil and having a kinematic viscosity at 100° C. of 2 to 10 mm²/s is employed.

Mineral oils are generally classified into several classes in accordance with the purification method, and in the present invention, a mineral oil having a wax content of 0.5 to 10% is generally employed. For example, a highly purified oil produced by hydrocracking purification, having a low pour point, having a high viscosity index and containing isoparaffin as a major ingredient is employable.

Examples of the synthetic hydrocarbon oils include α-olefin oligomers, alkylbenzenes and alkylnaphthalenes. These synthetic hydrocarbon oils can be used singly or in combination of two or more kinds. As the α-olefin oligomer, a low-molecular weight oligomer of at least one olefin selected from olefins of 8 to 12 carbon atoms is employable. Such an α-olefin oilgomer can be prepared by cation polymerization, thermal polymerization or radical polymerization, using Zieger catalyst or Lewis acid as a catalyst.

Most of the alkylbenzenes and the alkylnaphthalenes are usually dialkylbenzenes or dialkylnaphthalenes having an alkyl chain length of 6 to 14 carbon atoms, and such alkylbenzenes or alkylnaphthalenes are prepared by Friedel-Crafts alkylation reaction of benzene or naphthalene with olefin. The alkylation olefin used in the preparation of the alkylbenzenes or the alkylnaphthalenes may be a linear or branched olefin or a combination of linear and branched olefins. The preparation process thereof is described in, for example, U.S. Pat. No. 3,909,432.

Examples of the ester oils include monoesters prepared from monobasic acid and alcohol; diesters prepared from diol and monobasic acid or acid mixture; polyol esters prepared by the reaction of diol, triol (e.g., trimethylolpropane), tetraol (e.g., pentaerythritol), hexaol (e.g., dipentaerythritol) or the like with monobasic acid or acid mixture. Examples of such esters include tridecyl pelargonate, di-2-ethylhexyl adipate, di-2-ethylhexyl azelate, trimethylolpropane triheptanoate and pentaerythritol tetraheptanoate.

As the additives employable in the lubricating oil composition of the present invention, the following compounds can be exemplified, and they can be used singly or in combination of two or more kinds.

Examples of the detergent dispersants include metallic sulfonate, metallic phenate, metallic phosphonate and succinimide. The detergent dispersant is usually used in an amount of 0 to 15% by weight.

Examples of the pour point depressants include polymethacrylate and alkylnaphthalene. The pour point depressant is usually used in an amount of 0 to 3% by weight.

Examples of the extreme pressure agents include sulfur type extreme pressure agents, such as sulfides, sulfoxides, sulfones, thiophosphinates, thiocarbonates, sulfurized fats and oils, and olefin sulfides; phosphoric acids, such as phosphoric esters, phosphorous esters, phosphoric ester amine salts and phosphorous ester amines; and halogen compounds, such as chlorinated hydrocarbons. The extreme pressure agent is used in an amount of 0 to 15% by weight, when needed.

Examples of the anti-abrasion agents include inorganic or organic molybdenum compounds such as molybdenum disulfide, organic boron compounds such as alkylmercaptyl borate, graphite, antimony sulfide, boron compounds and polytetrafluoroethylene. The anti-abrasion agent is used in an amount of 0 to 3% by weight, when needed.

Examples of the antioxidants include phenol compounds, such as 2,6-di-tert-butyl-4-methylphenol, and amine compounds. The antioxidant is used in an amount of 0 to 3% by weight, when needed.

Examples of the rust proof agents include various amine compounds, carboxylic acid metal salts, polyhydric alcohol esters, phosphorus compounds and sulfonates. The rust proof agent is used in an amount of 0 to 3% by weight, when needed.

Examples of the anti-foaming agents include silicone compounds, such as dimethylsiloxane and a silica gel dispersion, alcohol compounds and ester compounds. The anti-foaming agent is used in an amount of 0 to 0.2% by weight, when needed.

In addition to the above additives, demulsifying agents, colorants, oiliness agents (oiliness improvers), etc. can be used, when needed.

EFFECT OF THE INVENTION

The synthetic lubricating oil of the present invention has properties of lower evaporation at high temperatures and higher thermal oxidation stability as compared with conventional mineral oils or synthetic oils, and is excellent in viscosity index and low-temperature viscosity properties. Therefore, by using the synthetic lubricating oil of the present invention alone or by blending it with another base oil such as mineral oil or α-olefin oligomer to prepare a lubricating base oil, excellent temperature-viscosity properties and shear stability are exhibited, and thermal oxidation stability can be remarkably improved.

EXAMPLES

The synthetic lubricating oil of the present invention is used as a lubricating oil (engine oil, transmission gear oil, ATF, CVT-F, differential gear oil), an industrial lubricating oil (gear oil, hydraulic oil) or a grease base oil. The present invention is further described with reference to the following examples, but it should be construed that the present invention is in no way limited to those examples.

Average Molecular Weight, Molecular Weight Distribution

The number average molecular weight (Mn) and the molecular weight distribution (Mw/Mn) were measured in the following manner using GPC (Chromatopack C-R4A) manufactured by Shimadzu Corporation. In the measurement, TSK G6000H XL, G4000H XL, G3000H XL and G2000H XL were used as separatory columns; the column temperature was set at 40° C.; tetrahydrofuran (available from Wako Pure Chemical Industries, Ltd.) was used as a mobile phase; the developing rate was 0.8 ml/min; the sample concentration was 0.2% by weight; the sample pour quantity was 20 microliters; and a differential refractometer was used as a detector. As standard polystyrene, polystyrene available from Tosoh Corporation was used.

Content of Unsaturated Groups at Molecular One Ends

The content of unsaturated groups at the molecular one ends was measured in the following manner using EX400 type nuclear magnetic resonance device manufactured by JEOL Ltd. A sample was obtained by dissolving a polymer in deuterated chloroform (Aldrich, 99.8 atom % D) as a rock solvent and adjusted to 2% by weight in a sample tube, and $^1$H-NMR of the sample was measured at room temperature. With respect to a peak of each hydrogen of the polymer, a peak (A) based on a terminal saturated methyl group is observed at 0.65 to 0.85 ppm, a peak (B) based on a vinylidene group is observed at 4.70 ppm to 4.80 ppm, a peak (C) and a peak (D) based on a vinyl group are observed at 4.85 to 5.0 ppm and 5.7 to 5.9 ppm, respectively, a peak (E) based on an inner olefin is observed at 5.10 to 5.30 ppm, and a peak (F) based on a methylene group is observed at 0.90 to 2.0 ppm. If peak areas of the peaks (A), (B), (C), (D), (E) and (F) are taken as SA, SB, SC, SD, SE and SF, respectively, the number N of unsaturated bonds based on the number of all protons is calculated from the following formula (33) using intensities of the peaks (A), (B), (C), (D), (E) and (F).

$$N(\text{number/number of all protons}) = \frac{[S_B/2 + (S_C + S_D)/3 + S_E]}{S_A + S_B + S_C + S_D + S_E + S_F} \quad (33)$$

A: methyl (0.65-0.85 ppm)
B: vinylidene (4.70-4.80 ppm)
C: vinyl (4.85-5.00 ppm)
D: vinyl (5.70-5.90 ppm)
E: inner olefin (tri-substituted olefin) (5.1-5.3 ppm)
F: methylene (0.9-2.0 ppm)

The content of the unsaturated groups at the molecular one ends is calculated from the following formula (34) using N obtained from the above formula (33) and an absolute average molecular weight (M) measured from VPO.

Content of unsaturated groups at molecular one ends
$$(\%) = N \times M \times 2/14 \quad (34)$$

N: number of unsaturated groups (number/all protons)
M: absolute molecular weight Viscosity Properties The kinematic viscosity of the polymer at 100° C. and 40° C. and the viscosity index of the polymer were measured and calculated in accordance with a method described in JIS K2283.

The viscosity properties of a compounded oil were evaluated in the following manner. A polymer and PAO-6 (available from Nippon Steel Chemical Co., Ltd., SYNFLUID 601) in such amounts that the kinematic viscosity of the mixture at 100° C. became 14 mm$^2$/s, 15% of an ester oil (available from Daihachi Chemical Industry Co., Ltd., DIDA) and 6.5% of an extreme pressure agent (available from The Lubrizol Corporation, ANGRAMOL 98A) were blended to prepare a compounded oil. Then, the kinematic viscosity of the compounded oil at 100° C. and 40° C. and the viscosity index were measured and calculated in accordance with a method described in JIS K2283.

The pour point of the compounded oil was measured in accordance with a method described in JIS K2269.

As the low-temperature viscosity of the compounded oil, a viscosity of the compounded oil at −40° C. was measured by a Brookfield viscometer in accordance with ASTM D2983.

Shear Stability

The shear stability of the compounded oil was evaluated in accordance with a method described in DIN 52350-6 using a KRL shear stability tester. The compounded oil was allowed to stand at 60° C. for 20 hours under the shearing conditions (1450 rpm). The kinematic viscosity at 100° C. was measured before and after the test, and a decrease in kinematic viscosity was evaluated.

Thermal Oxidation Stability

The thermal oxidation stability was tested in the following manner. In a glass petri dish having a diameter of 55 mm, 30 g of a sample was placed, and the sample was allowed to stand still for 24 hours in a circulation air dryer kept at 180° C., then taken out and allowed to cool to a room temperature. By measuring a mass of the sample before and after the test, evaporation quantity was calculated from the following formula (35).

$$\text{Loss in weight (wt \%)} = (W1-W2)/W1 \times 100 \quad (35)$$

W1: weight before test
W2: weight after test

Further, the kinematic viscosity at 100° C. was measured before and after the test in accordance with a method described in JIS K2283, and an increase in viscosity was calculated from the following formula (36).

$$\text{Change in dynamic kinematic viscosity (\%)} = V2/V1 \times 100 \quad (36)$$

V1: dynamic kinematic viscosity before test
V2: dynamic kinematic viscosity after test The total acid value of the sample was measured before and after the test in accordance with a method described in JIS K2501, and an increase in total acid value was calculated from the following formula (37).

$$\text{Increase in total acid value (mgKOH/g)} = \text{total acid value before test} - \text{total acid value after test} \quad (37)$$

Example 1

A 1-liter glass autoclave was equipped with a thermometer, a gas feed pipe and a glass stirring blade and then thoroughly purged with nitrogen. Thereafter, 250 ml of n-decane and 250 ml of 1-decene were introduced into the autoclave, and the temperature of the autoclave was set at 100° C. with passing nitrogen through the autoclave at a rate of 50 liters/hr. Separately, in a 30-ml branched flask thoroughly purged with nitrogen, a magnetic stirrer tip was placed, and then 0.002 mmol of a toluene solution of ethylene(cyclopentadienyl)(2,7-di-tert-butyl-fluorenyl)zirconium dichloride and 2 mmol of a toluene solution of methylaluminoxane (Al: 1.53 M) were added, followed by stirring for 30 minutes. Passing of nitrogen through the glass autoclave was stopped, and to the autoclave were fed hydrogen at a rate of 20 liters/hr and ethylene at a rate of 5 liters/hr. Then, the above solution was added, and polymerization was initiated at a stirring rotational speed of 650 rpm. During the polymerization, hydrogen and ethylene were continuously fed at rates of 20 liters/hr and 5 liters/hr, respectively, and the polymerization was carried out at 100° C. for 60 minutes at atmospheric pressure. Thereafter, a small amount of isopropanol was added to terminate the polymerization. The resulting polymer solution was added to 300 ml of 1N hydrochloric acid, and they were stirred. The resulting solution was transferred into a separatory funnel, and an organic layer was withdrawn. The organic layer was washed with water, and then the solvent and the unreacted 1-decene were distilled off at 175° C. under reduced pressure (1 mmHg).

The amount of the transparent liquid polymer obtained was 81.07 g, and the polymerization activity was 40.5 kg-polymer/mmol-Zr·hr. As a result of polymer analysis, Mn was 1,950, and Mw/Mn was 1.70.

The kinematic viscosity, viscosity index, content of a polymer having a molecular weight (Mn), as measured by gel permeation chromatography, of not less than 20,000, content of a polymer having a molecular weight of not more than 1,000 and thermal oxidation stability of the resulting transparent liquid polymer are set forth in Table 1. The temperature-viscosity properties and shear stability of the compounded oil are set forth in Table 2.

Example 2

In a 1-liter stainless steel autoclave thoroughly purged with nitrogen, 300 ml of n-heptane and 200 ml of 1-decene were placed, and subsequently, 0.0015 mmol of a toluene solution of ethylene(cyclopentadienyl) (2,7-di-tert-butyl-fluorenyl)zirconium dichloride and 1.5 mmol of a toluene solution of methylaluminoxane (Al: 1.53 M) were added. Thereafter, the autoclave was pressurized to 0.785 MPa-G with a hydrogen gas, and polymerization was carried out at 63° C. for 60 minutes at a stirring rotational speed of 350 rpm. After the polymerization, pressure was released, and a small amount of isopropanol was added to terminate the polymerization. The resulting polymer solution was added to 300 ml of 1N hydrochloric acid, and they were stirred. The resulting solution was transferred into a separatory funnel, and an organic layer was withdrawn. The organic layer was washed with water, and then the solvent and the unreacted 1-decene were distilled off at 175° C. under reduced pressure (1 mmHg).

The amount of the transparent liquid polymer (1-decene polymer) obtained was 34.18 g, and the polymerization activity was 22.8 kg-polymer/mmol-Zr·hr. As a result of polymer analysis, Mn was 2,080, and Mw/Mn was 1.80.

The kinematic viscosity, viscosity index, content of a polymer having a molecular weight (Mn), as measured by gel permeation chromatography, of not less than 20,000, content of a polymer having a molecular weight of not more than 1,000 and thermal oxidation stability of the resulting transparent liquid polymer are set forth in Table 1. The temperature-viscosity properties and shear stability of the compounded oil are set forth in Table 2.

Example 3

In a 1-liter stainless steel autoclave thoroughly purged with nitrogen, 630 ml of n-heptane and 70 ml of 1-decene were placed, and subsequently, 0.2 mmol of triisobutylaluminum, 0.0021 mmol of a toluene solution of diphenylsilylene(cyclopentadienyl)-(octamethyloctahydrodibenzofluorenyl)zirconium dichloride and finally 0.0084 mmol of a toluene solution of N,N-dimethylanilinium tetrakis(pentafluorophenyl)borate were added. Thereafter, the autoclave was pressurized to 0.785 MPa-G with a hydrogen gas, and polymerization was carried out at 63° C. for 180 minutes at a stirring rotational speed of 350 rpm. After the polymerization, pressure was released, and a small amount of isopropanol was added to terminate the polymerization. The resulting polymer solution was added to 300 ml of 1N hydrochloric acid, and they were stirred. The resulting solution was transferred into a separatory funnel, and an organic layer was withdrawn. The organic layer was washed with water, and then the solvent and the unreacted 1-decene were distilled off at 175° C. under reduced pressure (1 mmHg).

The amount of the transparent liquid polymer (1-decene polymer) obtained was 15.29 g, and the polymerization activity was 2.4 kg-polymer/mmol-Zr·hr. As a result of polymer analysis, Mn was 2,130, and Mw/Mn was 1.51.

The kinematic viscosity, viscosity index, content of a polymer having a molecular weight (Mn), as measured by gel permeation chromatography, of not less than 20,000, content of a polymer having a molecular weight of not more than 1,000 and thermal oxidation stability of the resulting transparent liquid polymer are set forth in Table 1. The temperature-viscosity properties and shear stability of the compounded oil are set forth in Table 2.

Example 4

In a 1-liter stainless steel autoclave thoroughly purged with nitrogen, 630 ml of n-heptane and 70 ml of 1-decene were placed, and subsequently, 0.2 mmol of triisobutylaluminum, 0.002 mmol of a toluene solution of di(p-tolyl)methylene (cyclopentadienyl)-(octamethyloctahydrodibenzofluorenyl) zirconium dichloride and finally 0.008 mmol of a toluene solution of N,N-dimethylanilinium tetrakis(pentafluorophenyl)borate were added. Thereafter, the autoclave was pressurized to 0.785 MPa-G with a hydrogen gas, and polymerization was carried out at 90° C. for 60 minutes at a stirring rotational speed of 350 rpm. After the polymerization, pressure was released, and a small amount of isopropanol was added to terminate the polymerization. The resulting polymer solution was added to 300 ml of 1N hydrochloric acid, and they were stirred. The resulting solution was transferred into a separatory funnel, and an organic layer was withdrawn. The organic layer was washed with water, and then the solvent and the unreacted 1-decene were distilled off at 175° C. under reduced pressure (1 mmHg).

The amount of the transparent liquid polymer (1-decene polymer) obtained was 40.03 g, and the polymerization activity was 20.0 kg-polymer/mmol-Zr·hr. As a result of polymer analysis, Mn was 3,850, and Mw/Mn was 1.58.

The kinematic viscosity, viscosity index, content of a polymer having a molecular weight (Mn), as measured by gel permeation chromatography, of not less than 20,000, content of a polymer having a molecular weight of not more than 1,000 and thermal oxidation stability of the resulting transparent liquid polymer are set forth in Table 1. The temperature-viscosity properties and shear stability of the compounded oil are set forth in Table 2.

Example 5

In a 2-liter stainless steel autoclave thoroughly purged with nitrogen, 850 ml of n-heptane and 150 ml of 1-decene were placed, and the temperature of the system was raised to 85° C. Then, hydrogen was fed to make the total pressure 4 MPa-G. Subsequently, 0.4 mmol of triisobutylaluminum, 0.004 mmol of di(p-tolyl)methylene(cyclopentadienyl)-(octamethyloctahydrodibenzofluorenyl)zirconium dichloride and 0.016 mmol of N,N-dimethylanilinium tetrakis(pentafluorophenyl) borate were forced into the autoclave with nitrogen, and polymerization was carried out at 90° C. for 60 minutes at a stirring rotational speed of 400 rpm. To the system, a small amount of isopropanol was added to terminate the polymerization. The resulting polymer solution was added to 300 ml of 1N hydrochloric acid, and they were stirred. The resulting solution was transferred into a separatory funnel, and an organic layer was withdrawn. The organic layer was washed with water, and then the solvent and the unreacted 1-decene were distilled off at 175° C. under reduced pressure (1 mmHg).

The amount of the transparent liquid polymer (1-decene polymer) obtained was 83.00 g, and the polymerization activity was 20.8 kg-polymer/mmol-Zr·hr. As a result of polymer analysis, Mn was 2,110, and Mw/Mn was 1.52.

The kinematic viscosity, viscosity index, content of a polymer having a molecular weight (Mn), as measured by gel permeation chromatography, of not less than 20,000, content of a polymer having a molecular weight of not more than 1,000 and thermal oxidation stability of the resulting transparent liquid polymer are set forth in Table 1. The temperature-viscosity properties and shear stability of the compounded oil are set forth in Table 2.

Example 6

In a 1-liter stainless steel autoclave thoroughly purged with nitrogen, 400 ml of n-heptane and 100 ml of 1-decene were placed, and subsequently, 0.2 mmol of triisobutylaluminum, 0.0025 mmol of a toluene solution of ethylene(cyclopentadienyl)-(octamethyloctahydrodibenzofluorenyl)zirconium dichloride and finally 0.01 mmol of a toluene solution of N,N-dimethylanilinium tetrakis(pentafluorophenyl)borate were added. Thereafter, the autoclave was pressurized to 0.785 MPa-G with a hydrogen gas, and polymerization was carried out at 65° C. for 60 minutes at a stirring rotational speed of 350 rpm. After the polymerization, pressure was released, and a small amount of isopropanol was added to terminate the polymerization. The resulting polymer solution was added to 300 ml of 1N hydrochloric acid, and they were stirred. The resulting solution was transferred into a separatory funnel, and an organic layer was withdrawn. The organic layer was washed with water, and then the solvent and the unreacted 1-decene were distilled off at 175° C. under reduced pressure (1 mmHg).

The amount of the transparent liquid polymer (1-decene polymer) obtained was 28.44 g, and the polymerization activity was 11.4 kg-polymer/mmol-Zr·hr. As a result of polymer analysis, Mn was 2,180, and Mw/Mn was 1.46.

The kinematic viscosity, viscosity index, content of a polymer having a molecular weight (Mn), as measured by gel permeation chromatography, of not less than 20,000, content of a polymer having a molecular weight of not more than 1,000 and thermal oxidation stability of the resulting transparent liquid polymer are set forth in Table 1. The temperature-viscosity properties and shear stability of the compounded oil are set forth in Table 2.

Example 7

In a 1-liter stainless steel autoclave thoroughly purged with nitrogen, 630 ml of n-heptane and 70 ml of 1-decene were placed, and subsequently, 0.2 mmol of triisobutylaluminum, 0.002 mmol of a toluene solution of di(p-tolyl)methylene (cyclopentadienyl)(2,7-dimethyl-3,6-di-tert-butyl-fluorenyl) zirconium dichloride and finally 0.008 mmol of a toluene solution of N,N-dimethylanilinium tetrakis(pentafluorophenyl)borate were added. Thereafter, the autoclave was pressurized to 0.785 MPa-G with a hydrogen gas, and polymerization was carried out at 90° C. for 60 minutes at a stirring rotational speed of 350 rpm. After the polymerization, pressure was released, and a small amount of isopropanol was added to terminate the polymerization. The resulting polymer solution was added to 300 ml of 1N hydrochloric acid, and they were stirred. The resulting solution was transferred into a separatory funnel, and an organic layer was withdrawn. The organic layer was washed with water, and then the solvent and the unreacted 1-decene were distilled off at 175° C. under reduced pressure (1 mmHg).

The amount of the transparent liquid polymer (1-decene polymer) obtained was 39.97 g, and the polymerization activity was 20.0 kg-polymer/mmol-Zr·hr. As a result of polymer analysis, Mn was 4,740, and Mw/Mn was 1.60.

The kinematic viscosity, viscosity index, content of a polymer having a molecular weight (Mn), as measured by gel permeation chromatography, of not less than 20,000, content of a polymer having a molecular weight of not more than 1,000 and thermal oxidation stability of the resulting transparent liquid polymer are set forth in Table 1. The temperature-viscosity properties and shear stability of the compounded oil are set forth in Table 2.

Example 8

The procedure of Example 7 was repeated, except that the di(p-tolyl)methylene(cyclopentadienyl)(2,7-dimethyl-3,6-di-tert-butyl-fluorenyl)zirconium dichloride was replaced with di(p-chlorophenyl)methylene(cyclopentadienyl)-(octamethyloctahydrodibenzofluorenyl)zirconium dichloride.

The amount of the transparent liquid polymer (1-decene polymer) obtained was 43.07 g, and the polymerization activity was 21.5 kg-polymer/mmol-Zr·hr. As a result of polymer analysis, Mn was 4,240 and Mw/Mn was 1.60.

The kinematic viscosity, viscosity index, content of a polymer having a molecular weight (Mn), as measured by gel permeation chromatography, of not less than 20,000, content of a polymer having a molecular weight of not more than 1,000 and thermal oxidation stability of the resulting transparent liquid polymer are set forth in Table 1. The temperature-viscosity properties and shear stability of the compounded oil are set forth in Table 2.

Example 9

The procedure of Example 7 was repeated, except that the di(p-tolyl)methylene(cyclopentadienyl)(2,7-dimethyl-3,6-di-tert-butyl-fluorenyl)zirconium dichloride was replaced with di(p-chlorophenyl)methylene(cyclopentadienyl)(2,7-diphenyl-3,6-di-tert-butyl-fluorenyl)zirconium dichloride.

The amount of the transparent liquid polymer (1-decene polymer) obtained was 43.95 g, and the polymerization activity was 22.0 kg-polymer/mmol-Zr·hr. As a result of polymer analysis, Mn was 8,150, and Mw/Mn was 1.71.

The kinematic viscosity, viscosity index, content of a polymer having a molecular weight (Mn), as measured by gel permeation chromatography, of not less than 20,000, content of a polymer having a molecular weight of not more than 1,000 and thermal oxidation stability of the resulting transparent liquid polymer are set forth in Table 1. The temperature-viscosity properties and shear stability of the compounded oil are set forth in Table 2.

Example 10

The procedure of Example 7 was repeated, except that the di(p-tolyl)methylene(cyclopentadienyl)(2,7-dimethyl-3,6-di-tert-butyl-fluorenyl)zirconium dichloride was replaced with di(p-chlorophenyl)methylene(cyclopentadienyl)(2,7-dimethyl-3,6-di-tert-butyl-fluorenyl)zirconium dichloride.

The amount of the transparent liquid polymer (1-decene polymer) obtained was 42.72 g, and the polymerization activity was 21.4 kg-polymer/mmol-Zr·hr. As a result of polymer analysis, Mn was 5,130, and Mw/Mn was 1.64.

The kinematic viscosity, viscosity index, content of a polymer having a molecular weight (Mn), as measured by gel permeation chromatography, of not less than 20,000, content of a polymer having a molecular weight of not more than 1,000 and thermal oxidation stability of the resulting transparent liquid polymer are set forth in Table 1. The temperature-viscosity properties and shear stability of the compounded oil are set forth in Table 2.

Comparative Example 1

In a 1-liter stainless steel autoclave thoroughly purged with nitrogen, 300 ml of n-heptane and 200 ml of 1-decene were placed, and subsequently, 0.002 mmol of a toluene solution of di(phenyl)methylene(cyclopentadienyl)(fluorenyl)zirconium dichloride and 2 mmol of a toluene solution of methylaluminoxane (Al: 1.53 M) were added. Thereafter, the autoclave was pressurized to 0.785 MPa-G with a hydrogen gas, and polymerization was carried out at 90° C. for 60 minutes at a stirring rotational speed of 350 rpm. After the polymerization, pressure was released, and a small amount of isopropanol was added to terminate the polymerization. The resulting polymer solution was added to 300 ml of 1N hydrochloric acid, and they were stirred. The resulting solution was transferred into a separatory funnel, and an organic layer was withdrawn. The organic layer was washed with water, and then the solvent and the unreacted 1-decene were distilled off at 175° C. under reduced pressure (1 mmHg).

The amount of the transparent liquid polymer obtained was 28.89 g, and the polymerization activity was 14.4 kg-polymer/mmol-Zr·hr. As a result of polymer analysis, Mn was 6,800, and Mw/Mn was 2.02.

The kinematic viscosity, viscosity index, content of a polymer having a molecular weight (Mn), as measured by gel permeation chromatography, of not less than 20,000, content of a polymer having a molecular weight of not more than 1,000 and thermal oxidation stability of the resulting transparent liquid polymer are set forth in Table 1. The temperature-viscosity properties and shear stability of the compounded oil are set forth in Table 2.

Comparative Example 2

In a 2-liter stainless steel autoclave thoroughly purged with nitrogen, 1000 ml of 1-decene was placed, and the temperature of the system was raised to 145° C. Then, hydrogen was fed to make the total pressure 2.5 MPa-G. Subsequently, 0.005 mmol of a toluene solution of di(phenyl)methylene (cyclopentadienyl) (2,7-di-tert-butyl-fluorenyl)zirconium dichloride and 2.0 mmol of a toluene solution of methylaluminoxane (Al: 1.53 M) were forced into the autoclave with nitrogen, and polymerization was carried out at 150° C. for 60 minutes at a stirring rotational speed of 400 rpm. To the system, a small amount of isopropanol was added to terminate the polymerization. The resulting polymer solution was added to 300 ml of 1N hydrochloric acid, and they were stirred. The resulting solution was transferred into a separatory funnel, and an organic layer was withdrawn. The organic layer was washed with water, and then the solvent and the unreacted 1-decene were distilled off at 175° C. under reduced pressure (1 mmHg).

The amount of the transparent liquid polymer (1-decene polymer) obtained was 305.40 g, and the polymerization activity was 61.1 kg-polymer/mmol-Zr·hr. As a result of polymer analysis, Mn was 4,280, and Mw/Mn was 1.62.

The kinematic viscosity, viscosity index, content of a polymer having a molecular weight (Mn), as measured by gel permeation chromatography, of not less than 20,000, content of a polymer having a molecular weight of not more than 1,000 and thermal oxidation stability of the resulting transparent liquid polymer are set forth in Table 1. The temperature-viscosity properties and shear stability of the compounded oil are set forth in Table 2.

Comparative Example 3

In a 100-ml glass flask purged with nitrogen, 100 ml of toluene and 3 mmol of bis(1,3-dimethylcyclopentadienyl) zirconium dichloride were placed to prepare a catalyst.

To a continuous polymerization reactor were continuously fed purified toluene at a rate of 1 liter/hr, purified 1-decene at a rate of 1 liter/hr, methylaluminoxane in an amount of 11 mmol/liter and the above-prepared zirconium catalyst in an amount of 0.02 mmol/liter. To the polymerization reactor were further continuously fed ethylene at a rate of 50 liters/hr, nitrogen at a rate of 120 liters/hr and hydrogen at a rate of 30 liters/hr at the same time, and polymerization was carried out under the conditions of a polymerization temperature of 45° C., a pressure of atmospheric pressure and a residence time of 1.0 hour. The polymer solution was continuously withdrawn from the polymerization reactor, and a small amount of methanol was added to terminate the polymerization. To the polymer solution, 1 liter of water and a small amount (about 20 ml) of hydrochloric acid were added, and they were stirred for 15 minutes and then allowed to stand still to separate an aqueous layer. Then, 2 liters of water were added, and they were stirred for 10 minutes and then allowed to stand still to separate an aqueous layer. This operation was repeated twice. Thereafter, toluene was removed from the polymer solution to obtain a colorless transparent liquid polymer (ethylene/1-decene copolymer). This liquid polymer was dried at 180° C. for 1 hour under reduced pressure (15 mmHg).

The activity based on unit zirconium was 1.02 kg-polymer/mmol-Zr·hr. As a result of polymer analysis, Mw was 4,310, Mn was 2,890, and Mw/Mn was 1.49.

The kinematic viscosity, viscosity index, content of a polymer having a molecular weight (Mn), as measured by gel permeation chromatography, of not less than 20,000, content of a polymer having a molecular weight of not more than 1,000 and thermal oxidation stability of the resulting transparent liquid polymer are set forth in Table 1. The temperature-viscosity properties and shear stability of the compounded oil are set forth in Table 2.

Comparative Example 4

Evaluation was carried out in the same manner as in Example 1, except that a commercially available ethylene/propylene copolymer (from Mitsui Chemicals, Inc., Lucant HC-40) was used. The results are set forth in Table 1 and Table 2.

TABLE 1

| | Monomer | Compositional ratio (mol %) | Mn Number-average mol. weight | Mw/Mn | A: mol Weight not more than 1000 (%) | B: mol Weight not less than 2000 (%) | Kinematic viscosity | VI | Unsaturated group content | Thermal oxidation stability | | |
|---|---|---|---|---|---|---|---|---|---|---|---|---|
| | | | | | | | | | | Loss in weight | Change of kinematic viscosity | Increase of total acid value (mgKOH) |
| Ex. 1 | C10/C2 | 90/10 | 1950 | 1.7 | 14.11 | 0.2 | 14.84 | 184 | 9.6 | 0.73 | 108.7 | 0.69 |
| Ex. 2 | C10 | 100 | 2080 | 1.8 | 9.85 | 1.31 | 37.05 | 177 | 5.3 | 0.88 | 108.4 | 0.31 |
| Ex. 3 | C10 | 100 | 2130 | 1.51 | 8.07 | 0 | 35.22 | 177 | 0.2 | 0.84 | 107.2 | 1.21 |
| Ex. 4 | C10 | 100 | 3850 | 1.58 | 0.81 | 1.1 | 91.13 | 200 | 0.6 | 0.6 | 108.5 | 1.37 |
| Ex. 5 | C10 | 100 | 2110 | 1.52 | 7.64 | 0.01 | 37.07 | 177 | 1 | 0.31 | 107.3 | 1.25 |
| Ex. 6 | C10 | 100 | 2180 | 1.46 | 6.83 | 0 | 36.16 | 177 | 0.3 | 0.73 | 107.8 | 1.33 |
| Ex. 7 | C10 | 100 | 4740 | 1.6 | 0.1 | 3.2 | 129.7 | 215 | 5.6 | 0.84 | 113.1 | 1.05 |
| Ex. 8 | C10 | 100 | 4240 | 1.6 | 0.62 | 1.89 | 112.5 | 208 | 0.26 | 0.68 | 104.1 | 1.22 |
| Ex. 9 | C10 | 100 | 8150 | 1.71 | 0 | 21.57 | 349.8 | 256 | 0.3 | 0.58 | 104.7 | 1.16 |
| Ex. 10 | C10 | 100 | 5130 | 1.64 | 0.08 | 5.07 | 157.5 | 222 | 5.35 | 0.63 | 112.0 | 1.25 |
| Comp. Ex. 1 | C10 | 100 | 6800 | 2.02 | 1.45 | 15.07 | 336.2 | 252 | 11.6 | 1.33 | 115.5 | 1.18 |
| Comp. Ex. 2 | C10 | 100 | 4280 | 1.62 | 0.79 | 1.02 | 88 | 192 | 13.6 | 1.05 | 111.4 | 1.44 |
| Comp. Ex. 3 | C10/C2 | 90/10 | 2890 | 1.49 | 6.59 | 0.3 | 37.15 | 174 | 55.1 | 1.26 | 120.8 | 1.52 |

TABLE 2

| | Compounding (%) | | | Viscosity-temperature properties | | | | Shear Stability |
|---|---|---|---|---|---|---|---|---|
| | (A) α-olefin(co) polymer | (B) PAO-6/ DIDA = 4/1 | (C) Additive | Kinematic viscosity @ 100° C. (mm²/S) | Viscosity index VI | Pour point (° C.) | −40° C. viscosity (mPa·s) | Decrease of shear viscosity (%) |
| Ex. 1 | 64 | 29.5 | 6.5 | 14.1 | 145 | −47.5 | 30000 | 0.5 |
| Ex. 2 | 55.9 | 37.6 | 6.5 | 14.02 | 172 | −52.5 | 17600 | 0.5 |
| Ex. 3 | 52.7 | 40.8 | 6.5 | 13.97 | 172 | −50.0 | 18400 | 0.5 |
| Ex. 4 | 35.5 | 58 | 6.5 | 13.87 | 175 | −50.0 | 26200 | 0.8 |
| Ex. 5 | 51.4 | 42.1 | 6.5 | 13.97 | 172 | −50.0 | 18800 | 0.5 |
| Ex. 6 | 52 | 41.5 | 6.5 | 14.08 | 172 | −52.5 | 18600 | 0.5 |

TABLE 2-continued

| | Compounding (%) | | | Viscosity-temperature properties | | | | Shear Stability |
|---|---|---|---|---|---|---|---|---|
| | (A) α-olefin(co) polymer | (B) PAO-6/ DIDA = 4/1 | (C) Additive | Kinematic viscosity @ 100° C. (mm²/S) | Viscosity index VI | Pour point (° C.) | −40° C. viscosity (mPa · s) | Decrease of shear viscosity (%) |
| Ex. 7 | 33.1 | 60.4 | 6.5 | 14.11 | 175 | −50.0 | 27700 | 0.7 |
| Ex. 8 | 31.6 | 61.9 | 6.5 | 14.09 | 176 | −50.0 | 28700 | 0.6 |
| Ex. 9 | 24.2 | 69.3 | 6.5 | 14.05 | 185 | −50.0 | 34800 | 1.5 |
| Ex. 10 | 29.8 | 63.7 | 6.5 | 13.84 | 177 | −50.0 | 29100 | 1.2 |
| Comp. Ex. 1 | 24.5 | 69 | 6.5 | 13.97 | 185 | −50.0 | 35000 | 2.0 |
| Comp. Ex. 2 | 35.9 | 57.6 | 6.5 | 14.22 | 174 | −50.0 | 24900 | 0.5 |
| Comp. Ex. 3 | 51.3 | 42.2 | 6.5 | 14.28 | 156 | −45 | 372000 | 0.5 |
| Comp. Ex. 4 | 44 | 49.5 | 6.5 | 13.8 | 150 | −40 | 60600 | 0.2 |

PAO-6: poly-α-olefin (available from Nippon Steel Chemical Co., Ltd., SYNFLUID 601)
Ester oil: DIDA (available from Daihachi Chemical Industry Co., Ltd., diisodecyl adipate)
Additive: extreme pressure agent (available from The Lubrizol Corporation, ANGRAMOL 98A)

As described above, the α-olefin (co)polymers of the present invention exhibited high thermal oxidation stability and had excellent viscosity index, low-temperature viscosity and shear stability.

INDUSTRIAL APPLICABILITY

The synthetic lubricating oil of the present invention comprising the α-olefin (co)polymer exhibits properties of lower evaporation at high temperatures and higher thermal oxidation stability as compared with conventional mineral oils or synthetic oils, and is excellent in high viscosity index, low-temperature viscosity properties and shear stability.

Accordingly, by using the synthetic lubricating oil of the present invention alone or by blending it with another base oil to prepare a lubricating base oil, a lubricating oil such as mineral oil or α-olefin oligomer having excellent temperature-viscosity properties, shear stability and thermal oxidation stability can be provided.

What is claimed is:
1. A synthetic lubricating oil comprising an α-olefin (co) polymer defined by the following features (i) to (vi):
 (i) said (co)polymer contains constituent units derived from (a) 1-decene in amounts of 90 to 100% by mol and contains constituent units derived from (b) ethylene in amounts of 0 to 10% by mol,
 (ii) the kinematic viscosity at 100° C. is in the range of 8 to 500 mm²/s,
 (iii) the number-average molecular weight (Mn), as measured by gel permeation chromatography, is in the range of 500 to 15,000,
 (iv) said (co)polymer satisfies the following formulas (I) and (II):

$$A \leq 24.0 \times \mathrm{Exp}(-0.0239 \times K) \quad (\mathrm{I})$$

$$B \leq 0.0775 \times K \quad (\mathrm{II})$$

wherein A is a content (%) of a (co)polymer having a molecular weight, as measured by gel permeation chromatography, of not more than 1,000, B is a content (%) of a (co)polymer having a molecular weight of not less than 20,000, and K is a kinematic viscosity (mm²/s) at 100° C.,
 (v) the molecular weight distribution (Mw/Mn) is in the range of 1.1 to 1.8, and
 (vi) the content of unsaturated groups at the end of polymers is in the range of 0.001 to 10%, wherein the α-olefin (co)polymer is prepared in the presence of an olefin polymerization catalyst comprising:
 (A) a transition metal compound having a structure represented by the following formula [5] or [6], and
 (B) at least one compound selected from the group consisting of:
 (B-1) an organometallic compound,
 (B-2) an organoaluminum compound,
 (B-3) an organoaluminum oxy-compound, and
 (B-4) a compound which reacts with the compound (A) to form an ion pair;

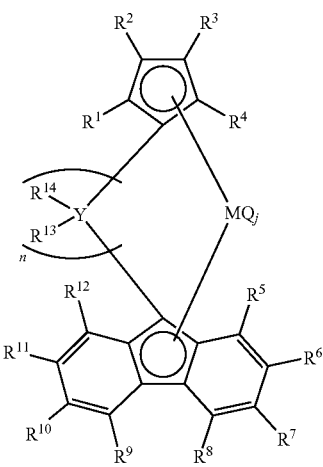

[5]

wherein $R^1$, $R^2$, $R^3$, $R^4$, $R^5$, $R^6$, $R^7$, $R^8$, $R^9$, $R^{10}$, $R^{11}$, $R^{12}$, $R^{13}$ and $R^{14}$ are each selected from the group consisting of hydrogen, a hydrocarbon group and a silicon-containing hydrocarbon group and may be the same or different, and neighboring substituents among $R^1$ to $R^{14}$ may be bonded to each other to form a ring; M is zirconium, titanium or hafnium; Y is a Group 14 atom; Q is selected from the group consisting of a halogen, a hydrogen atom, a hydrocarbon group of 1 to 10 carbon atoms, a neutral, conjugated or non-conjugated diene of 10 or less carbon atoms, an anionic ligand and a neutral ligand capable of coordination with a lone pair, and each Q may be the same or different; n is an integer of 2 or 3; and j is an integer of 1 to 4;

[6]

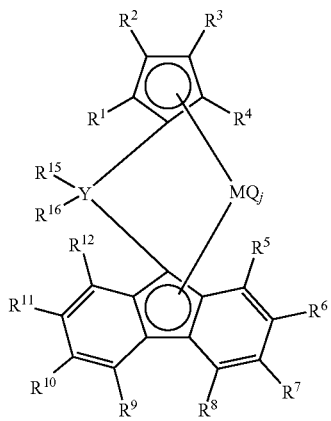

wherein $R^1$, $R^2$, $R^3$, $R^4$, $R^5$, $R^6$, $R^7$, $R^8$, $R^9$, $R^{10}$, $R^{11}$, $R^{12}$, $R^{15}$ and $R^{16}$ are each selected from the group consisting of a hydrogen atom, a hydrocarbon group and a silicon-containing hydrocarbon group and may be the same or different, and neighboring groups among them may be bonded to each other to form a ring; $R^6$ and $R^{11}$ are the same atoms or groups selected from the group consisting of hydrogen, a hydrocarbon group and a silicon-containing hydrocarbon group and may be bonded to each other to form a ring; $R^7$ and $R^{10}$ are the same atoms or groups selected from the group consisting of hydrogen, a hydrocarbon group and a silicon-containing hydrocarbon group, and may be bonded to each other to form a ring; and $R^6$, $R^7$, $R^{10}$ and $R^{11}$ are not hydrogen atoms at the same time; $R^{15}$ and $R^{16}$ may be the same or different; M is zirconium, titanium or hafnium; Y is carbon or silicon; Q is selected from the group consisting of a halogen, a hydrocarbon group, an anionic ligand and a neutral ligand capable of coordination with a lone pair, and each Q may be the same or different; and j is an integer of 1 to 4.

2. The synthetic lubricating oil as claimed in claim 1, wherein the α-olefin (co)polymer is prepared without a hydrogenation step.

3. The synthetic lubricating oil as claimed in claim 1, wherein M is Zr or Hf.

\* \* \* \* \*